United States Patent
Chwast et al.

(10) Patent No.: US 9,754,271 B2
(45) Date of Patent: *Sep. 5, 2017

(54) ESTIMATING THE SPEND CAPACITY OF CONSUMER HOUSEHOLDS

(71) Applicant: American Express Travel Related Services Company, Inc., New York, NY (US)

(72) Inventors: Jeffrey A. Chwast, Woodmere, NY (US); Kathleen Haggerty, Staten Island, NY (US); Jing Wang, Summit, NJ (US); Di W. Xu, Edison, NJ (US); Chao M. Yuan, Montclair, NJ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 823 days.

This patent is subject to a terminal disclaimer.

(21) Appl. No.: 13/769,670

(22) Filed: Feb. 18, 2013

(65) Prior Publication Data

US 2013/0179216 A1 Jul. 11, 2013

Related U.S. Application Data

(63) Continuation of application No. 13/432,890, filed on Mar. 28, 2012, now Pat. No. 8,401,889, which is a (Continued)

(51) Int. Cl.
*G06Q 30/02* (2012.01)
*G06Q 20/10* (2012.01)
(Continued)

(52) U.S. Cl.
CPC ....... *G06Q 30/0201* (2013.01); *G06Q 20/105* (2013.01); *G06Q 30/0202* (2013.01);
(Continued)

(58) Field of Classification Search
CPC combination set(s) only.
See application file for complete search history.

(56) References Cited

U.S. PATENT DOCUMENTS

| 5,621,201 A | 4/1997 | Langhans et al. |
| 5,699,527 A | 12/1997 | Davidson |

(Continued)

FOREIGN PATENT DOCUMENTS

| JP | 2001282957 | 10/2001 |
| JP | 2002163449 | 6/2002 |
| JP | 2003316950 | 11/2003 |
| WO | 0116896 | 3/2001 |
| WO | 0139090 | 5/2001 |
| WO | 0180053 | 10/2001 |
| WO | 0237367 | 5/2002 |

OTHER PUBLICATIONS

Dataman Group web page from Aug. 22, 2001 downloaded from http://web.archive.org/web/20010822113446/http://www.datamangroup.com/summarized_credit.asp (1 of 2) on Sep. 14, 2010 10:48:45 AM.*

(Continued)

*Primary Examiner* — Mark A Fleischer
(74) *Attorney, Agent, or Firm* — Snell & Wilmer L.L.P.

(57) ABSTRACT

The spend capacity of a consumer typically increases as the number of consumers in the household increases, since the consumer can draw on the spending power of other consumers in the household. The size of wallet of the household is thus a better indicator of the consumer's spend capacity than an individual size of wallet. All consumers in a given household can be aggregated based on, for example, their address of record. Duplicate tradelines within each household are removed from consideration in a size of wallet estimate. A spend capacity is then estimated for each tradeline using calculations derived from a consumer behavior model. The spend capacities for all tradelines in the household are combined to determine a household size of wallet. Each consumer in the household is then tagged with the household size of wallet, rather than their individual size of wallet.

20 Claims, 19 Drawing Sheets

Related U.S. Application Data continuation of application No. 11/611,699, filed on Dec. 15, 2006, now Pat. No. 8,204,774, which is a continuation-in-part of application No. 10/978,298, filed on Oct. 29, 2004, now Pat. No. 7,788,147.

(51) Int. Cl.
  *G06Q 40/00* (2012.01)
  *G06Q 30/00* (2012.01)

(52) U.S. Cl.
  CPC ..... *G06Q 30/0224* (2013.01); *G06Q 30/0234* (2013.01); *G06Q 30/0236* (2013.01); *G06Q 30/0251* (2013.01); *G06Q 30/0269* (2013.01); *G06Q 40/00* (2013.01)

(56) References Cited

U.S. PATENT DOCUMENTS

| | | |
|---|---|---|
| 5,712,985 A | 1/1998 | Lee et al. |
| 5,819,226 A | 10/1998 | Gopinathan et al. |
| 5,864,830 A | 1/1999 | Armetta et al. |
| 5,930,774 A | 7/1999 | Chennault |
| 5,966,699 A | 10/1999 | Zandi |
| 5,974,396 A | 10/1999 | Anderson et al. |
| 5,999,919 A | 12/1999 | Jarecki et al. |
| 6,021,362 A | 2/2000 | Maggard |
| 6,026,398 A | 2/2000 | Brown |
| 6,058,375 A | 5/2000 | Park |
| 6,105,001 A | 8/2000 | Masi et al. |
| 6,119,103 A | 9/2000 | Basch et al. |
| 6,128,599 A | 10/2000 | Walker et al. |
| 6,134,548 A | 10/2000 | Gottsman et al. |
| 6,185,543 B1 | 2/2001 | Galperin et al. |
| 6,202,053 B1 | 3/2001 | Christiansen et al. |
| 6,249,770 B1 | 6/2001 | Erwin et al. |
| 6,266,649 B1 | 7/2001 | Linden et al. |
| 6,298,348 B1 | 10/2001 | Eldering |
| 6,307,958 B1 | 10/2001 | Deaton et al. |
| 6,311,169 B2 | 10/2001 | Duhon |
| 6,324,524 B1 | 11/2001 | Lent et al. |
| 6,330,546 B1 | 12/2001 | Gopinathan et al. |
| 6,374,230 B1 | 4/2002 | Walker et al. |
| 6,405,181 B2 * | 6/2002 | Lent et al. ............ 705/38 |
| 6,415,259 B1 | 7/2002 | Wolfinger |
| 6,430,539 B1 | 8/2002 | Lazarus et al. |
| 6,654,727 B2 | 11/2003 | Tilton |
| 6,658,393 B1 | 12/2003 | Basch et al. |
| 6,658,412 B1 | 12/2003 | Jenkins et al. |
| 6,687,713 B2 | 2/2004 | Mattson et al. |
| 6,826,553 B1 | 11/2004 | DaCosta |
| 6,836,764 B1 | 12/2004 | Hucal |
| 6,839,682 B1 | 1/2005 | Blume et al. |
| 6,859,785 B2 | 2/2005 | Case |
| 6,999,943 B1 | 2/2006 | Johnson et al. |
| 7,076,462 B1 | 7/2006 | Nelson et al. |
| 7,165,036 B2 | 1/2007 | Kruk et al. |
| 7,191,150 B1 | 3/2007 | Shao et al. |
| 7,249,076 B1 * | 7/2007 | Pendleton et al. .......... 705/35 |
| 7,249,092 B2 | 7/2007 | Dunn et al. |
| 7,249,114 B2 | 7/2007 | Burchetta et al. |
| 7,324,962 B1 | 1/2008 | Valliani et al. |
| 7,346,573 B1 | 3/2008 | Cobrinik et al. |
| 7,373,324 B1 | 5/2008 | Engin et al. |
| 7,376,603 B1 * | 5/2008 | Mayr et al. ............ 705/35 |
| 7,376,618 B1 | 5/2008 | Anderson et al. |
| 7,403,942 B1 | 7/2008 | Bayliss |
| 7,409,362 B2 | 8/2008 | Calabria |
| 7,426,488 B1 | 9/2008 | Gompers et al. |
| 7,472,090 B1 | 12/2008 | White |
| 7,516,149 B2 * | 4/2009 | Motwani et al. |
| 7,552,074 B2 | 6/2009 | Bruce et al. |
| 7,555,451 B2 | 6/2009 | Rugge et al. |
| 7,624,070 B2 | 11/2009 | Lebouitz |
| 7,647,257 B2 | 1/2010 | Allen et al. |
| 7,647,344 B2 | 1/2010 | Skurtovich et al. |
| 7,657,471 B1 | 2/2010 | Sankaran et al. |
| 7,657,540 B1 | 2/2010 | Bayliss |
| 7,665,657 B2 | 2/2010 | Huh |
| 7,716,125 B2 | 5/2010 | Shavit et al. |
| 7,753,259 B1 | 7/2010 | Taylor et al. |
| 7,788,147 B2 | 8/2010 | Haggerty et al. |
| 7,792,715 B1 | 9/2010 | Kasower |
| 7,818,399 B1 | 10/2010 | Ross, Jr. et al. |
| 7,890,420 B2 | 2/2011 | Haggerty et al. |
| 7,912,842 B1 | 3/2011 | Bayliss |
| 7,912,865 B2 | 3/2011 | Akerman et al. |
| 7,945,512 B2 | 5/2011 | Scipioni et al. |
| 7,966,235 B1 | 6/2011 | Capelli et al. |
| RE42,663 E | 8/2011 | Lazarus et al. |
| 8,001,153 B2 | 8/2011 | Skurtovich et al. |
| 8,065,264 B1 | 11/2011 | Achanta |
| 8,078,530 B2 | 12/2011 | Haggerty et al. |
| 8,082,245 B2 | 12/2011 | Bates et al. |
| 8,239,250 B2 | 8/2012 | Kalia et al. |
| 8,266,168 B2 | 9/2012 | Bayliss |
| 8,275,770 B2 | 9/2012 | Bayliss |
| 8,296,229 B1 | 10/2012 | Yellin et al. |
| 8,326,712 B2 | 12/2012 | Deliwala et al. |
| 8,433,632 B2 | 4/2013 | Sankaran et al. |
| 8,504,470 B1 | 8/2013 | Chirehdast |
| 8,615,458 B2 | 12/2013 | Kalia et al. |
| 8,762,191 B2 | 6/2014 | Lawrence |
| 2001/0011245 A1 | 8/2001 | Duhon |
| 2001/0013011 A1 * | 8/2001 | Day et al. ............ 705/14 |
| 2001/0027413 A1 * | 10/2001 | Bhutta ............ 705/14 |
| 2001/0037294 A1 | 11/2001 | Freishtat |
| 2001/0054022 A1 | 12/2001 | Louie et al. |
| 2002/0019804 A1 | 2/2002 | Sutton |
| 2002/0029188 A1 | 3/2002 | Schmid |
| 2002/0046096 A1 | 4/2002 | Srinivasan et al. |
| 2002/0049626 A1 | 4/2002 | Mathias et al. |
| 2002/0052836 A1 | 5/2002 | Galperin et al. |
| 2002/0052884 A1 | 5/2002 | Farber et al. |
| 2002/0073099 A1 | 6/2002 | Gilbert et al. |
| 2002/0077964 A1 | 6/2002 | Brody et al. |
| 2002/0095360 A1 | 7/2002 | Joao |
| 2002/0099649 A1 | 7/2002 | Lee et al. |
| 2002/0107765 A1 | 8/2002 | Walker |
| 2002/0123960 A1 | 9/2002 | Ericksen |
| 2002/0133444 A1 | 9/2002 | Sankaran et al. |
| 2002/0143661 A1 | 10/2002 | Tumulty |
| 2002/0147623 A1 | 10/2002 | Rifaat |
| 2002/0174016 A1 | 11/2002 | Cuervo |
| 2002/0178096 A1 | 11/2002 | Marshall |
| 2002/0194099 A1 | 12/2002 | Weiss |
| 2002/0194117 A1 | 12/2002 | Nabe et al. |
| 2002/0194140 A1 | 12/2002 | Makuck |
| 2002/0198688 A1 | 12/2002 | Feldman |
| 2002/0198801 A1 | 12/2002 | Dixon |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0018549 A1 | 1/2003 | Fei et al. |
| 2003/0046223 A1 | 3/2003 | Crawford et al. |
| 2003/0061132 A1 | 3/2003 | Yu et al. |
| 2003/0093289 A1 | 5/2003 | Thornley et al. |
| 2003/0101131 A1 | 5/2003 | Warren et al. |
| 2003/0105696 A1 | 6/2003 | Kalotay et al. |
| 2003/0113727 A1 | 6/2003 | Girn et al. |
| 2003/0115080 A1 | 6/2003 | Kasravi et al. |
| 2003/0120477 A1 | 6/2003 | Kruk et al. |
| 2003/0120504 A1 | 6/2003 | Kruk et al. |
| 2003/0130878 A1 | 7/2003 | Kruk et al. |
| 2003/0130884 A1 | 7/2003 | Michaluk |
| 2003/0139986 A1 | 7/2003 | Roberts |
| 2003/0149610 A1 | 8/2003 | Rowan et al. |
| 2003/0149659 A1 | 8/2003 | Danaher et al. |
| 2003/0171942 A1 | 9/2003 | Bayliss |
| 2003/0208428 A1 | 11/2003 | Raynes et al. |
| 2003/0212618 A1 | 11/2003 | Keyes et al. |
| 2003/0229580 A1 | 12/2003 | Gass et al. |

(56) References Cited

U.S. PATENT DOCUMENTS

| | | |
|---|---|---|
| 2003/0236725 A1 | 12/2003 | Hickox et al. |
| 2004/0002916 A1 | 1/2004 | Timmerman et al. |
| 2004/0024692 A1 | 2/2004 | Turbeville et al. |
| 2004/0034570 A1 | 2/2004 | Davis |
| 2004/0064401 A1 | 4/2004 | Palaghita et al. |
| 2004/0073442 A1 | 4/2004 | Heyns et al. |
| 2004/0073467 A1 | 4/2004 | Heyns et al. |
| 2004/0078248 A1 | 4/2004 | Altschuler |
| 2004/0088221 A1 | 5/2004 | Katz et al. |
| 2004/0088257 A1 | 5/2004 | Wong et al. |
| 2004/0093278 A1 | 5/2004 | Burchetta et al. |
| 2004/0107123 A1 | 6/2004 | Haffner et al. |
| 2004/0107161 A1 | 6/2004 | Tanaka et al. |
| 2004/0111363 A1 | 6/2004 | Trench et al. |
| 2004/0128174 A1 | 7/2004 | Feldman |
| 2004/0133474 A1 | 7/2004 | Tami |
| 2004/0162763 A1 | 8/2004 | Hoskin et al. |
| 2004/0177030 A1 | 9/2004 | Shoham |
| 2004/0177036 A1 | 9/2004 | Nutahara et al. |
| 2004/0199456 A1 | 10/2004 | Flint et al. |
| 2004/0225586 A1 | 11/2004 | Woods et al. |
| 2004/0230459 A1 | 11/2004 | Dordick et al. |
| 2005/0015330 A1 | 1/2005 | Beery et al. |
| 2005/0033734 A1 | 2/2005 | Chess et al. |
| 2005/0055275 A1 | 3/2005 | Newman et al. |
| 2005/0071208 A1 | 3/2005 | Brennen et al. |
| 2005/0080698 A1 | 4/2005 | Perg et al. |
| 2005/0125322 A1 | 6/2005 | Lacomb et al. |
| 2005/0125334 A1 | 6/2005 | Masella et al. |
| 2005/0149371 A1 | 7/2005 | Wang et al. |
| 2005/0159996 A1 | 7/2005 | Lazarus et al. |
| 2005/0171884 A1 | 8/2005 | Arnott |
| 2005/0197954 A1 | 9/2005 | Maitland et al. |
| 2005/0261993 A1 | 11/2005 | Delivanis |
| 2005/0262014 A1 | 11/2005 | Fickes |
| 2005/0289025 A1 | 12/2005 | Fredericks et al. |
| 2006/0004654 A1 | 1/2006 | Kornegay et al. |
| 2006/0009990 A1 | 1/2006 | McCormick |
| 2006/0010055 A1 | 1/2006 | Morita et al. |
| 2006/0015377 A1 | 1/2006 | Hoogs et al. |
| 2006/0031150 A1 | 2/2006 | Senturk |
| 2006/0059063 A1 | 3/2006 | Lacomb et al. |
| 2006/0095923 A1 | 5/2006 | Novack et al. |
| 2006/0143071 A1 | 6/2006 | Hofmann |
| 2006/0143075 A1 | 6/2006 | Carr |
| 2006/0155624 A1 | 7/2006 | Schwartz |
| 2006/0173726 A1 | 8/2006 | Hall et al. |
| 2006/0178957 A1 | 8/2006 | LeClaire |
| 2006/0195390 A1 | 8/2006 | Rusk et al. |
| 2006/0229943 A1 | 10/2006 | Mathias et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0253328 A1 | 11/2006 | Kohli et al. |
| 2006/0259364 A1 | 11/2006 | Strock et al. |
| 2006/0265259 A1 | 11/2006 | Diana et al. |
| 2006/0271552 A1 | 11/2006 | McChesney et al. |
| 2006/0282356 A1 | 12/2006 | Andres et al. |
| 2007/0011026 A1 | 1/2007 | Higgins et al. |
| 2007/0016501 A1 | 1/2007 | Chatterji et al. |
| 2007/0055598 A1 | 3/2007 | Arnott et al. |
| 2007/0055599 A1 | 3/2007 | Arnott |
| 2007/0067206 A1 | 3/2007 | Haggerty et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0078741 A1 | 4/2007 | Haggerty et al. |
| 2007/0083418 A1 | 4/2007 | Quiring et al. |
| 2007/0100719 A1 | 5/2007 | Chwast et al. |
| 2007/0100724 A1 | 5/2007 | Hollas et al. |
| 2007/0157028 A1 | 7/2007 | Lott |
| 2007/0168246 A1 | 7/2007 | Haggerty et al. |
| 2007/0168267 A1 | 7/2007 | Zimmerman et al. |
| 2007/0192165 A1 | 8/2007 | Haggerty et al. |
| 2007/0226114 A1 | 9/2007 | Haggerty et al. |
| 2007/0226130 A1 | 9/2007 | Haggerty et al. |
| 2007/0244779 A1 | 10/2007 | Wolff |
| 2007/0265957 A1 | 11/2007 | Advani et al. |
| 2007/0282681 A1 | 12/2007 | Shubert |
| 2007/0294154 A1 | 12/2007 | Henninger |
| 2008/0031326 A1 | 2/2008 | Lecomte |
| 2008/0033852 A1 | 2/2008 | Megdal et al. |
| 2008/0033857 A1 | 2/2008 | Moses |
| 2008/0195425 A1 | 8/2008 | Haggerty et al. |
| 2008/0195444 A1 | 8/2008 | Haggerty et al. |
| 2008/0195445 A1 | 8/2008 | Haggerty et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222015 A1 | 9/2008 | Megdal et al. |
| 2008/0222016 A1 | 9/2008 | Megdal et al. |
| 2008/0222027 A1 | 9/2008 | Megdal et al. |
| 2008/0222054 A1 | 9/2008 | Blagg et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0255897 A1 | 10/2008 | Megdal et al. |
| 2008/0275820 A1 | 11/2008 | Joao et al. |
| 2008/0319808 A1 | 12/2008 | Wofford et al. |
| 2009/0006245 A1 | 1/2009 | Rabson |
| 2009/0055295 A1 | 2/2009 | Bargil |
| 2009/0106141 A1 | 4/2009 | Becker |
| 2009/0132347 A1 | 5/2009 | Anderson et al. |
| 2009/0144160 A1 | 6/2009 | Haggerty et al. |
| 2009/0144185 A1 | 6/2009 | Haggerty et al. |
| 2009/0271246 A1 | 10/2009 | Alvarez et al. |
| 2010/0088220 A1 | 4/2010 | Langley |
| 2010/0094910 A1 | 4/2010 | Bayliss |
| 2010/0250469 A1 | 9/2010 | Megdal et al. |
| 2010/0287093 A1 | 11/2010 | He et al. |
| 2011/0078011 A1 | 3/2011 | Senghore et al. |
| 2011/0078073 A1 | 3/2011 | Annappindi |
| 2011/0276471 A1 | 11/2011 | Haggerty et al. |
| 2012/0046979 A1 | 2/2012 | Chatterji et al. |
| 2012/0084230 A1 | 4/2012 | Megdal et al. |
| 2012/0109734 A1 | 5/2012 | Fordyce et al. |
| 2012/0116951 A1 | 5/2012 | Chung et al. |
| 2012/0123968 A1 | 5/2012 | Megdal et al. |
| 2012/0136763 A1 | 5/2012 | Megdal et al. |
| 2012/0185296 A1 | 7/2012 | Haggerty et al. |
| 2012/0185297 A1 | 7/2012 | Chatterji et al. |
| 2012/0185373 A1 | 7/2012 | Grody |
| 2012/0221452 A1 | 8/2012 | Haggerty et al. |
| 2012/0271744 A1 | 10/2012 | Kalia et al. |
| 2013/0268324 A1 | 10/2013 | Megdal et al. |
| 2013/0275331 A1 | 10/2013 | Megdal et al. |
| 2014/0012633 A1 | 1/2014 | Megdal et al. |
| 2014/0019331 A1 | 1/2014 | Megdal et al. |
| 2014/0032384 A1 | 1/2014 | Megdal et al. |
| 2014/0058926 A1 | 2/2014 | Haggerty et al. |

OTHER PUBLICATIONS

Office Action dated Mar. 1, 2013 in U.S. Appl. No. 11/586,737.
Office Action dated Mar. 7, 2013 in U.S. Appl. No. 13/403,736.
Notice of Allowance dated Mar. 11, 2013 in U.S. Appl. No. 13/622,957.
Office Action dated Jul. 16, 2014 in Canadian Application No. 2,592,944.
Advisory Action dated Sep. 15, 2014 in U.S. Appl. No. 12/180,256.

(56) References Cited

OTHER PUBLICATIONS

Office Action dated Sep. 23, 2014in U.S. Appl. No. 13/032/427.
Office Action dated Oct. 8, 2014 in U.S. Appl. No. 13/403,778.
Advisory Action dated Jun. 3, 2015 in U.S. Appl. No. 11/586,728.
Office Action dated Jun. 9, 2015 in U.S. Appl. No. 13/860,872.
Advisory Action dated Jul. 6, 2015 in U.S. Appl. No. 14/318,516.
Final Office Action dated Jul. 9, 2015 in U.S. Appl. No. 13/403,651.
Advisory Action dated Jul. 10, 2015 in U.S. Appl. No. 14/188,400.
Advisory Action dated Jul. 15, 2015 in U.S. Appl. No. 13/403,768.
Advisory Action dated Jul. 16, 2015 in U.S. Appl. No. 13/403,752.
Final Office Action dated Jul. 17, 2015 in U.S. Appl. No. 14/085,522.
Department of the Treasury Financial Management Service, Guide to the Federal Credit Bureau Program, Published 2001, http://fms.treas.gov/fedreg/guidance/fedcreditbureauguide.pdf.
Final Office Action dated Oct. 10, 2014 in U.S. Appl. No. 13/403,680.
Office Action dated Nov. 5, 2014 in U.S. Appl. No. 14/188,400.
Office Action dated Nov. 7, 2014 in U.S. Appl. No. 14/085,522.
Office Action dated Dec. 4, 2014 in U.S. Appl. No. 13/403,752.
Office Action dated Dec. 18, 2014 in U.S. Appl. No. 11/586,728.
Office Action dated Dec. 19, 2014 in U.S. Appl. No. 13/403,768.
Herbert Edelstein. Data Mining: The Key to Profitable Customer Relationship Management. Technology Transfer. Feb. 2002. p. 1-5. http://www.technologytransfer.eu/article/9/2002/2/Data_Mining_The_Key_to_Profitable_Customer_Relationship_Management.html
Final Office Action dated Sep. 17, 2013 in U.S. Appl. No. 13/403,680.
Notice of Allowance dated Sep. 19, 2013 in U.S. Appl. No. 13/776,178.
Office Action dated Sep. 26, 2013 in U.S. Appl. No. 12/144,506.
Office Action dated Oct. 2, 2013 in U.S. Appl. No. 13/794,465.
Office Action dated Oct. 7, 2013 in U.S. Appl. No. 11/169,664.
Final Office Action dated Oct. 11, 2013 in U.S. Appl. No. 13/403,700.
Final Office Action dated Oct. 11, 2013 in U.S. Appl. No. 13/403,752.
Final Office Action dated Oct. 24, 2013 in U.S. Appl. No. 13/403,768.
Final Office Action dated Oct. 24, 2013 in U.S. Appl. No. 12/180,256.
Office Action dated Oct. 25, 2013 in U.S. Appl. No. 13/403,728.
Final Office Action dated Oct. 30, 2013 in U.S. Appl. No. 12/103,418.
Notice of Allowance dated Nov. 6, 2013 in U.S. Appl. No. 13/899,438.
Notice of Allowance dated Nov. 8, 2013 in U.S. Appl. No. 13/899,403.
Office Action dated Nov. 14, 2013 in U.S. Appl. No. 13/972,650.
Office Action dated Nov. 2, 2015 in Canadian Application No. 2,592,944.
Office Action dated Dec. 4, 2015 in U.S. Appl. No. 14/188,400.
Advisory Action dated Dec. 8, 2015 in U.S. Appl. No. 14/168,306.
Advisory Action dated Dec. 18, 2015 in U.S. Appl. No. 13/032,427.
Advisory Action dated Dec. 21, 2015 in U.S. Appl. No. 13/403,700.
Office Action dated Jan. 8, 2016 in U.S. Appl. No. 13/403,778.
Office Action dated Jan. 14, 2016 in U.S. Appl. No. 14/318,836.
"Balance Transfers Offer Opportunities, Risk Credit Management Report" Jan. 29, 1996, vol. 6, Issue 2, Phillips Business Information—Newsletter, pp. 1-3.
"Credit Trends," Experian Information Solutions, Inc., Aug. 2000, pp. 1-4.
Final Office Action dated Dec. 20, 2013 in U.S. Appl. No. 13/403,778.
Advisory Action dated Jan. 17, 2014 in U.S. Appl. No. 12/103,418.
Notice of Allowance dated Jan. 24, 2014 in U.S. Appl. No. 14/070,297.
Office Action dated Feb. 3, 2014 in U.S. Appl. No. 13/032,427.
Final Office Action dated Feb. 5, 2014 in U.S. Appl. No. 13/794,465.
Final Office Action dated Feb. 5, 2014 in U.S. Appl. No. 13/644,541.
Office Action dated Feb. 12, 2014 in U.S. Appl. No. 12/180,256.
Office Action dated Jan. 13, 2015 in U.S. Appl. No. 12/144,506.
Final Office Action dated Jan. 16, 2015 in U.S. Appl. No. 12/103,418.
Final Office Action dated Feb. 13, 2015 in U.S. Appl. No. 13/403,778.
Office Action dated Feb. 24, 2015 in U.S. Appl. No. 13/032,427.
Advisory Action dated Mar. 2, 2015 in U.S. Appl. No. 12/103,418.
Final Office Action dated Mar. 3, 2015 in U.S. Appl. No. 14/085,522.
Advisory Action dated Mar. 11, 2015 in U.S. Appl. No. 13/403,680.
Office Action dated Mar. 13, 2015 in U.S. Appl. No. 14/318,836.
Examiner's Report dated Feb. 8, 2013 in Canadian Application No. 2,617,798.
Office Action dated Mar. 12, 2013 in Mexican Application No. MX/a/2007/012294.
Notice of Allowance dated Mar. 14, 2013 in U.S. Appl. No. 13/403,746.
Advisory Action dated Mar. 14, 2013 in U.S. Appl. No. 11/169,664.
Advisory Action dated Mar. 15, 2013 in U.S. Appl. No. 12/144,506.
Office Action dated Mar. 20, 2013 in U.S. Appl. No. 12/403,700.
Notice of Allowance dated Mar. 21, 2013 in U.S. Appl. No. 13/209,035.
Office Action dated Mar. 29, 2013 in U.S. Appl. No. 12/103,418.
Office Action dated Mar. 29, 2013 in U.S. Appl. No. 12/403,728.
Restriction Requirement dated Apr. 4, 2013 in U.S. Appl. No. 13/403,768.
Final Office Action dated Apr. 5, 2013 in U.S. Appl. No. 13/403,651.
Restriction Requirement dated Apr. 12, 2013 in U.S. Appl. No. 13/403,752.
Office Action dated Apr. 30, 2013 in U.S. Appl. No. 12/403,680.
Notice of Allowance dated May 2, 2013 in U.S. Appl. No. 13/403,634.
Xiao, Gourong, Data Processing Model of Bank Credit Evaluation, Jul. 2011, Journal of Software, 1241-1247.
Final Office Action dated Mar. 6, 2014 in U.S. Appl. No. 12/144,506.
Final Office Action dated Mar. 21, 2014 in U.S. Appl. No. 11/169,664.
Office Action dated Mar. 28, 2014 in U.S. Appl. No. 12/103,418.
Notice of Allowance dated Apr. 2, 2014 in U.S. Appl. No. 14/167,167.
Notice of Allowance dated Apr. 16, 2014 in U.S. Appl. No. 13/644,541.
Notice of Allowance dated Apr. 17, 2014 in U.S. Appl. No. 13/794,465.
Final Office Action dated May 1, 2014 in U.S. Appl. No. 11/169,778.
Notice of Allowance dated May 12, 2014 in U.S. Appl. No. 13/972,650.
Advisory Action dated May 14, 2014 in U.S. Appl. No. 12/144,506.
Notice of Allowance dated May 28, 2014 in U.S. Appl. No. 13/403,728.
Advisory Action dated Jun. 2, 2014 in U.S. Appl. No. 11/169,664.
Office Action dated Jun. 6, 2014 in U.S. Appl. No. 11/586,728.
Notice of Allowance dated Jun. 26, 2014 in U.S. Appl. No. 14/188,400.
Office Action dated Jul. 10, 2014 in U.S. Appl. No. 13/403,680.
Office Action dated Jul. 11, 2014 in U.S. Appl. No. 12/103,418.
Final Office Action dated Jul. 18, 2014 in U.S. Appl. No. 12/180,256.
Office Action dated Aug. 15, 2014 in U.S. Appl. No. 14/318,516.
Office Action dated Aug. 15, 2014 in U.S. Appl. No. 14/318,836.
"What is Hashing?—Definition from Whatis.com," from internet first published Sep. 2005, 5 pages, downloaded from http://searchsqlserver.techtarget.com/definition/hashing on Sep. 25, 2015.
Advisory Action dated Sep. 10, 2015 in U.S. Appl. No. 14/085,522.
Final Office Action dated Sep. 11, 2015 in U.S. Appl. No. 13/860,872.

(56) References Cited

OTHER PUBLICATIONS

Advisory Action dated Sep. 15, 2015 in U.S. Appl. No. 13/403,651.
Final Office Action dated Sep. 17, 2015 in U.S. Appl. No. 13/032,427.
Office Action dated Sep. 18, 2015 in U.S. Appl. No. 11/586,728.
Restriction Requirement dated Oct. 2, 2015 in U.S. Appl. No. 14/448,811.
Office Action dated Oct. 6, 2015 in U.S. Appl. No. 13/403,700.
Final Office Action dated Oct. 7, 2015 in U.S. Appl. No. 14/318,836.
Advisory Action dated Oct. 22, 2015 in U.S. Appl. No. 13/860,872.
Final Office Action dated Oct. 23, 2015 in U.S. Appl. No. 14/168,306.
Office Action dated Oct. 29, 2015 in U.S. Appl. No. 14/317,590.
Office Action dated Nov. 6, 2015 in U.S. Appl. No. 14/318,516.
Final Office Action dated Feb. 25, 2016 in U.S. Appl. No. 11/583,728.
Office Action dated Feb. 26, 2016 in U.S. Appl. No. 13/403,768.
Office Action dated Feb. 26, 2016 in U.S. Appl. No. 13/403,752.
Office Action dated Mar. 2, 2016 in U.S. Appl. No. 13/403,651.
Office Action dated Mar. 14, 2016 in U.S. Appl. No. 14/085,522.
Office Action dated Mar. 24, 2016 in U.S. Appl. No. 14/448,811.
Final Office Action dated Mar. 24, 2016 in U.S. Appl. No. 14/318,516.
Final Office Action dated Apr. 5, 2016 in U.S. Appl. No. 14/317,590.
Advisory Action dated May 16, 2016 in U.S. Appl. No. 14/318,516.
Final Office Action dated May 17, 2016 in U.S. Appl. No. 14/188,400.
Office Action dated Jun. 16, 2016 in U.S. Appl. No. 14/168,306.
Final Office Action dated Jun. 17, 2016 in U.S. Appl. No. 13/403,752.
Final Office Action dated Jun. 17, 2016 in U.S. Appl. No. 13/403,768.
Office Action dated Jun. 17, 2016 in U.S. Appl. No. 11/586,728.
Advisory Action dated May 2, 2016 in U.S. Appl. No. 11/586,728.
Notice of Allowance dated Aug. 24, 2016 in U.S. Appl. No. 13/403,651.
Office Action dated Aug. 24, 2016 in U.S. Appl. No. 14/318,516.
Office Action dated Aug. 12, 2016 in U.S. Appl. No. 13/860,872.
Advisory Action dated Sep. 1, 2016 in U.S. Appl. No. 13/403,752.
Advisory Action dated Sep. 2, 2016 in U.S. Appl. No. 13/403,768.
Final Office Action dated Sep. 6, 2016 in U.S. Appl. No. 14/085,522.
Advisory Action dated Sep. 6, 2016 in U.S. Appl. No. 14/318,836.
Office Action dated Sep. 15, 2016 in U.S. Appl. No. 14/318,836.
Office Action dated Sep. 26, 2016 in U.S. Appl. No. 13/403,700.
Final Office Action dated Oct. 24, 2016 in U.S. Appl. No. 14/318,369.
Examiner's Report dated Sep. 20, 2016 in Canadian Application No. 2,592,944.
Final Office Action dated Jun. 27, 2016 in U.S. Appl. No. 14/318,836.
Advisory Action dated Jul. 5, 2016 in U.S. Appl. No. 14/317,590.
Advisory Action dated Jul. 11, 2016 in U.S. Appl. No. 14/188,400.
Office Action dated Jul. 15, 2016 in U.S. Appl. No. 14/318,369.
Final Office Action dated Nov. 17, 2016 in U.S. Appl. No. 11/586,728.
Advisory Action dated Nov. 23, 2016 in U.S. Appl. No. 14/085,522.
Office Action dated Dec. 20, 2016 in U.S. Appl. No. 14/317,590.
Final Office Action dated Jan. 4, 2017 in U.S. Appl. No. 14/318,836.
Final Office Action dated Dec. 5, 2016 in U.S. Appl. No. 14/448,811.
Final Office Action dated Dec. 14, 2016 in U.S. Appl. No. 14/318,516.
Office Action dated Dec. 15, 2016 in U.S. Appl. No. 14/188,400.
Final Office Action dated Dec. 16, 2016 in U.S. Appl. No. 14/168,306.
Office Action dated Dec. 20, 2016 in U.S. Appl. No. 13/032,427.
Advisory Action dated Dec. 1, 2016 in U.S. Appl. No. 14/318,369.
Advisory Action dated Jan. 25, 2017 in U.S. Appl. No. 11/586,728.
Advisory Action dated Feb. 1, 2017 in U.S. Appl. No. 14/168,306.
Advisory Action dated Feb. 2, 2017 in U.S. Appl. No. 14/318,516.
Advisory Action dated Feb. 10, 2017 in U.S. Appl. No. 14/448,844.
Office Action dated Feb. 10, 2017 in U.S. Appl. No. 14/311,090.
Final Office Action dated Feb. 24, 2017 in U.S. Appl. No. 13/860,872.
Advisory Action dated Mar. 6, 2017 in U.S. Appl. No. 14/318,836.
Final Office Action dated Mar. 7, 2017 in U.S. Appl. No. 13/403,778.
Office Action dated Mar. 9, 2017 in U.S. Appl. No. 14/085,522.
Final Office Action dated Mar. 24, 2017 in U.S. Appl. No. 13/403,700.
Office Action dated Apr. 7, 2017 in U.S. Appl. No. 13/403,752.
Office Action dated Apr. 7, 2017 in U.S. Appl. No. 13/403,768.
Office Action dated Apr. 13, 2017 in U.S. Appl. No. 14/318,836.
Advisory Action dated May 4, 2017 in U.S. Appl. No. 13/860,872.
Office Action dated Apr. 10, 2015 in U.S. Appl. No. 13/403,700.
Advisory Action dated Apr. 10, 2015 in U.S. Appl. No. 13/403,778.
Final Office Action dated Apr. 10, 2015 in U.S. Appl. No. 11/586,728.
Office Action dated Apr. 16, 2015 in U.S. Appl. No. 13/403,651.
Final Office Action dated Apr. 20, 2015 in U.S. Appl. No. 14/318,516.
Office Action dated Apr. 22, 2015 in U.S. Appl. No. 14/168,306.
Final Office Action dated May 8, 2015 in U.S. Appl. No. 13/403,768.
Advisory Action dated May 13, 2015 in U.S. Appl. No. 14/085,522.
Final Office Action dated May 13, 2015 in U.S. Appl. No. 14/188,400.
Final Office Action dated May 22, 2015 in U.S. Appl. No. 13/403,752.
Office Action dated Jul. 9, 2013 in Canadian Application No. 2,592,944.
Notice of Allowance dated Jul. 24, 2013 in U.S. Appl. No. 13/403,736.
Notice of Allowance dated Aug. 13, 2013 in U.S. Appl. No. 11/586,737.
Office Action dated Aug. 16, 2031 in U.S. Appl. No. 13/644,541.
Notice of Allowance dated Aug. 20, 2013 in U.S. Appl. No. 11/586,737.
Advisory Action dated Aug. 23, 2013 in U.S. Appl. No. 13/032,427.
Office Action dated Aug. 23, 2013 in U.S. Appl. No. 11/169,778.
Advisory Action dated May 30, 2017 in U.S. Appl. No. 13/403,778.
Advisory Action dated May 31, 2017 in U.S. Appl. No. 13/403,700.

* cited by examiner 500 502

| From Experian TrendView | | | From ComScore Data | | | |
|---|---|---|---|---|---|---|
| Balance 3 | Balance 2 | Balance 1 | Purchase Volume | Last Payment | Previous balance | New Balance |
| 219 | 25 | 229 | 1465.47 | 1263.39 | 25.51 | 229.12 |
| 37 | 2 | 566 | 1187.14 | 650.64 | 2.64 | 566.11 |
| 6928 | 9192 | 27 | 10162.2 | 19354.84 | 9192.55 | 27.56 |
| 1434 | 32 | 54 | 1021.95 | 1000 | 32.05 | 54 |

|  |  | Predicted Paydown Percent | | | | |
|---|---|---|---|---|---|---|
|  |  | <5% | 5-20% | 20-50% | 50%-80% | 80%+ |
| Actual paydown percent | <5% | 55604 | 12230 | 1359 | 31 | 0 |
|  | 5-20% | 1314 | 5422 | 2282 | 54 | 1 |
|  | 20-50% | 64 | 429 | 1835 | 333 | 13 |
|  | 50%-80% | 1 | 41 | 492 | 301 | 53 |
|  | 80%+ | 0 | 22 | 534 | 1236 | 429 |

|  |  | Prediction | |
|---|---|---|---|
|  |  | Revolver | Transactor |
| Actual | Revolver | 80539 | 432 |
|  | Transactor | 1090 | 2019 |

|  |  | Predict | |
|---|---|---|---|
|  |  | No BT in | BT in |
| Actual | No BT in | 148,326 | 6,526 |
|  | BT in | 9,534 | 9,832 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 98,483 | 8,611 | 1,818 | 727 | 200 |
| | $500-1000 | 3,863 | 10,658 | 3,210 | 651 | 87 |
| | $1000-2000 | 2,220 | 2,474 | 7,192 | 2,727 | 245 |
| | $2000-5000 | 2,457 | 1,373 | 4,390 | 11,197 | 1,236 |
| | >$5000 | 520 | 336 | 1,011 | 3,512 | 5,020 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 116,821 | 7,388 | 2,521 | 1,269 | 98 |
| | $500-1000 | 6,118 | 15,455 | 6,908 | 1,635 | 70 |
| | $1000-2000 | 3,074 | 8,383 | 31,477 | 5,794 | 181 |
| | $2000-5000 | 826 | 2,200 | 9,052 | 36,441 | 797 |
| | >$5000 | 7 | 19 | 95 | 838 | 2,880 |

|  |  | Predicted Average Monthly Spending | | | | |
|---|---|---|---|---|---|---|
|  |  | <$500 | $500-1000 | $1000-2000 | $2000-5000 | >$5000 |
| Actual Spending | <$500 | 524,328 | 36,853 | 9,116 | 3,083 | 481 |
|  | $500-1000 | 25,942 | 104,009 | 17,292 | 3,304 | 280 |
|  | $1000-2000 | 8,478 | 20,132 | 82,363 | 10,722 | 583 |
|  | $2000-5000 | 3,574 | 4,125 | 15,852 | 57,077 | 2,250 |
|  | >$5000 | 557 | 399 | 1,184 | 4,624 | 8,323 |

| Rank Order | | Predicted Spending | |
|---|---|---|---|
|  |  | below 10% (< $1950) | top 10% (> $1950) |
| Actual Spending | below 10% (< $2050) | 827,716 | 22,721 |
|  | top 10% (> $2050) | 22,721 | 71,773 |

| | | Predicted Annual Total Spending | | | |
| --- | --- | --- | --- | --- | --- |
| | | <$10K | $10K-20K | $20-50K | >$50K |
| Actual Annual Total Spending | <$10K | 656,404 | 34,314 | 6,528 | 340 |
| | $10K-20K | 31,931 | 87,143 | 12,818 | 170 |
| | $20-50K | 3,390 | 21,242 | 68,009 | 1,715 |
| | >$50K | 112 | 582 | 7,525 | 9,018 |

| | | Predicted Annual Total Spending | | | |
| --- | --- | --- | --- | --- | --- |
| Rank Order | | Below top 20% (<$13K) | Top 10-20% ($13K-21.5K) | Top 5-10% ($21.5K-30.4K) | Top 5% (>$30.4K) |
| Actual Annual Total Spending | Below top 20% (<$13K) | 720,180 | 24,610 | 5,334 | 2,629 |
| | Top 10-20% ($13K-22.5K) | 27,336 | 51,082 | 7,477 | 2,366 |
| | Top 5-10% ($22.5K-32.9K) | 3,994 | 13,907 | 22,776 | 4,182 |
| | Top 5% (>$32.9K) | 1,483 | 4,525 | 11,473 | 37,885 |

FIG. 19

ESTIMATING THE SPEND CAPACITY OF CONSUMER HOUSEHOLDS

CROSS REFERENCE TO RELATED APPLICATIONS

The present application is a continuation of claims priority to and the benefit of, U.S. patent application Ser. No. 13/432,890, filed Mar. 28, 2012 and entitled "ESTIMATING THE SPEND CAPACITY OF CONSUMER HOUSEHOLDS." The '890 application is a continuation of, claims priority to and the benefit of, U.S. Pat. No. 8,204,774 issued Jun. 19, 2012 (aka U.S. patent application Ser. No. 11/611,699, filed Dec. 15, 2006) and entitled "ESTIMATING THE SPEND CAPACITY OF CONSUMER HOUSEHOLDS." The '774 patent is a continuation-in-part of, claims priority to and the benefit of, U.S. Pat. No. 7,788,147 issued Aug. 31, 2010 (aka U.S. patent application Ser. No. 10/978,298, filed Oct. 29, 2004) and entitled "METHOD AND APPARATUS FOR ESTIMATING THE SPEND CAPACITY OF CONSUMERS." All the aforementioned patents and applications are incorporated by reference herein in their entirety.

BACKGROUND OF THE INVENTION

Field

This disclosure generally relates to financial data processing, and in particular it relates to customer profiling and consumer behavior analysis.

Background Art

It is axiomatic that consumers will tend to spend more when they have greater purchasing power. The capability to accurately estimate a consumer's spend capacity could therefore allow a financial institution (such as a credit company, lender or any consumer services company) to better target potential prospects and identify any opportunities to increase consumer transaction volumes, without an undue increase in the risk of defaults. Attracting additional consumer spending in this manner, in turn, would increase such financial institution's revenues, primarily in the form of an increase in transaction fees and interest payments received. Consequently, accurate estimation of purchasing power is of paramount interest to many financial institutions and other consumer services companies.

The purchasing power of an individual consumer is often related to the total purchasing power of the consumer's household. However, understanding spending at a household level has been a challenge for financial institutions, because it is very difficult to group consumers by household. This is especially problematic when other individuals in the household do not maintain tradelines with the financial institution. Accordingly, there is a need for a method and apparatus for identifying members of a household of a consumer and determining the size of wallet of the entire household.

BRIEF SUMMARY

The spend capacity of a consumer typically increases as the number of consumers in the household increases. This occurs because an individual consumer can draw on the spending power of other consumers in the household. Identifying these consumers and determining the size of wallet of their households is beneficial to a financial institution, as it allows the financial institution to better target the consumers without increasing the risk of default by the consumers. In an exemplary method, all individuals in a given household are aggregated based on, for example, their address of record. Duplicate tradelines within each household are removed from consideration in a size of wallet estimate. A spend capacity is then estimated for each tradeline using calculations derived from a consumer behavior model. The spend capacities for all tradelines in the household are combined to determine a household size of wallet. Each consumer in the household is then tagged with the household size of wallet, rather than their individual size of wallet.

When consumer spending levels are reliably identified in this manner, consumers may be categorized to more effectively manage the customer relationship and increase the profitability therefrom. For instance, a financial institution can better identify customers who would most benefit from an offer for a new product or service or who would be most likely to increase their transaction volumes. High spending households can be targeted with the institution's best product offers and incentives, which encourages spending by members of that household using the account held at the financial institution.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 is a diagram of financial data used for model generation and validation according to the process of FIG. 2;

FIG. 11-19 are tables showing exemplary results and outputs of the process of FIG. 6 against a sample consumer population.

Figure 1A:
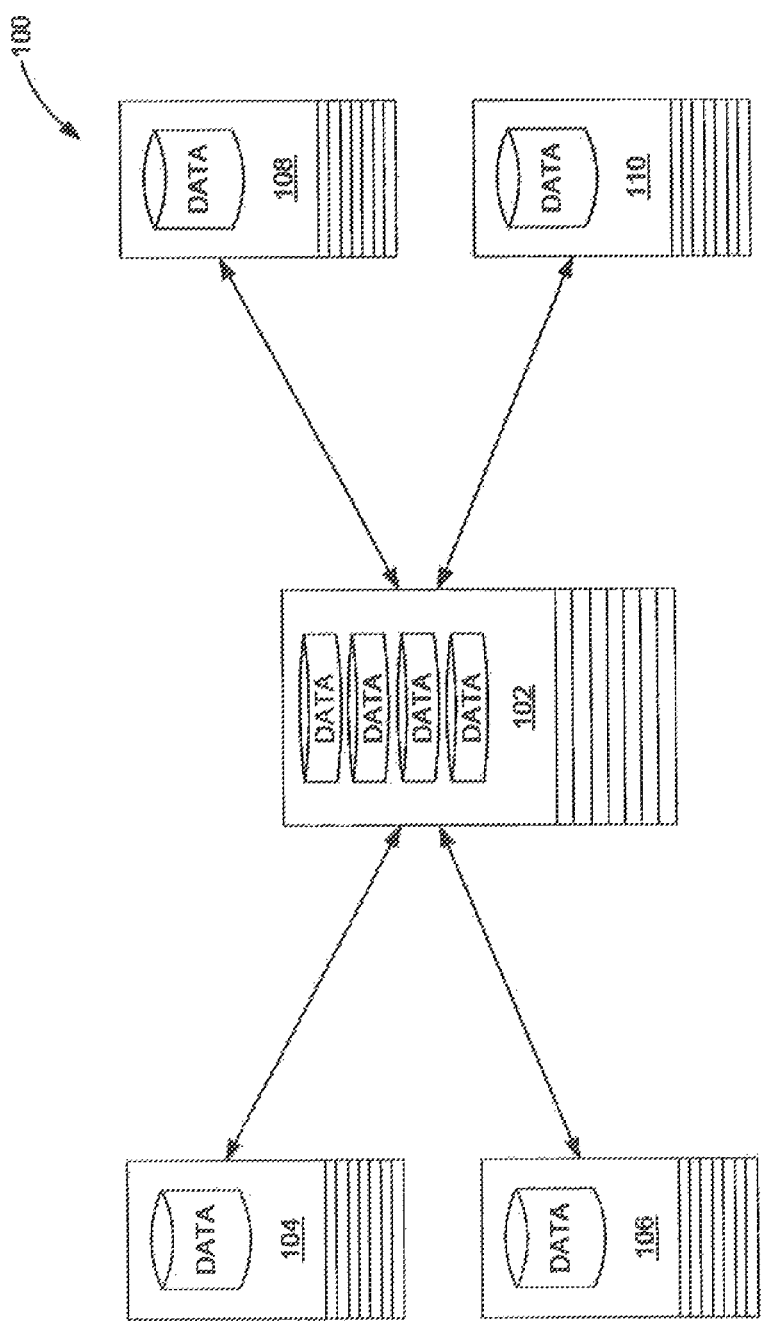
FIGS. 1A and 1B are block diagrams of an exemplary financial data exchange network over which the processes of the present disclosure may be performed.

The present invention will be described with reference to the accompanying drawings. The drawing in which an

DETAILED DESCRIPTION

I. Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for determining a household size of wallet.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (FDA), mobile telephone, kiosk, etc.), online communications, off-line communications, wireless communications, and/or the like.

A transaction account has a basic user, who is the primary user associated with the account. A transaction account may also have a supplemental user who is given access to the account by the basic user. The supplemental user may possess a duplicate of the transaction instrument associated with the account.

3. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

As used herein, the following terms shall have the following meanings. A trade or tradeline refers to a credit or charge vehicle issued to an individual customer by a credit grantor. Types of tradelines include, for example and without limitation, bank loans, credit card accounts, retail cards, personal lines of credit and car loans/leases. For purposes here, use of the term credit card shall be construed to include charge cards except as specifically noted. Tradeline data describes the customer's account status and activity, including, for example, names of companies where the customer has accounts, dates such accounts were opened, credit limits, types of accounts, balances over a period of time and summary payment histories. Tradeline data is generally available for the vast majority of actual consumers. Tradeline data, however, does not include individual transaction data, which is largely unavailable because of consumer privacy protections. Tradeline data may be used to determine both individual and aggregated consumer spending patterns, as described herein.

Consumer panel data measures consumer spending patterns from information that is provided by, typically, millions of participating consumer panelists. Such consumer panel data is available through various consumer research companies, such as comScore Networks, Inc. of Reston, Va. Consumer panel data may typically include individual consumer information such as credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, is limited to those consumers who have participated in the consumer panel, and so such detailed data may not be available for all consumers.

Although the present invention is described as relating to individual consumers, one of skill in the pertinent art(s) will recognize that it can also apply to small businesses and organizations without departing from the spirit and scope of the present invention.

II. Consumer Panel Data and Model Development/Validation

Technology advances have made it possible to store, manipulate and model large amounts of time series data with minimal expenditure on equipment. As will now be described, a financial institution may leverage these technological advances in conjunction with the types of consumer data presently available in the marketplace to more readily estimate the spend capacity of potential and actual customers. A reliable capability to assess the size of a consumer's wallet is introduced in which aggregate time series and raw tradeline data are used to model consumer behavior and attributes, and identify categories of consumers based on aggregate behavior. The use of raw trade-line time series data, and modeled consumer behavior attributes, including but not limited to, consumer panel data and internal consumer data, allows actual consumer spend behavior to be derived from point in time balance information.

In addition, the advent of consumer panel data provided through internet channels provides continuous access to actual consumer spend information for model validation and refinement. Industry data, including consumer panel information having consumer statement and individual transaction data, may be used as inputs to the model and for subsequent verification and validation of its accuracy. The model is developed and refined using actual consumer information with the goals of improving the customer experience and increasing billings growth by identifying and leveraging increased consumer spend opportunities.

A credit provider or other financial institution may also make use of internal proprietary customer data retrieved from its stored internal financial records. Such internal data provides access to even more actual customer spending information, and may be used in the development, refinement and validation of aggregated consumer spending models, as well as verification of the models' applicability to existing individual customers on an ongoing basis.

While there has long been market place interest in understanding spend to align offers with consumers and assign credit line size, the holistic approach of using a size of wallet calculation across customers' lifecycles (that is, acquisitions through collections) has not previously been provided. The various data sources outlined above provide the opportunity for unique model logic development and deployment, and as described in more detail in the following, various categories of consumers may be readily identified from aggregate and individual data. In certain embodiments of the processes disclosed herein, the models may be used to identify specific types of consumers, nominally labeled 'transactors' and 'revolvers,' based on aggregate spending behavior, and to then identify individual customers and prospects that fall into one of these categories. Consumers falling into these categories may then be offered commensurate purchasing incentives based on the model's estimate of consumer spending ability.

Referring now to FIGS. 1A, 1B, and 2-19, wherein similar components of the present disclosure are referenced in like manner, various embodiments of a method and system for estimating the purchasing ability of consumers will now be described in detail.

Turning now to FIG. 1A, there is depicted an exemplary computer network 100 over which the transmission of the various types of consumer data as described herein may be accomplished, using any of a variety of available computing components for processing such data in the manners described below. Such components may include an institution computer 102, which may be a computer, workstation or server, such as those commonly manufactured by IBM, and operated by a financial institution or the like. The institution computer 102, in turn, has appropriate internal hardware, software, processing, memory and network communication components that enables it to perform the functions described here, including storing both internally and externally obtained individual or aggregate consumer data in appropriate memory and processing the same according to the processes described herein using programming instructions provided in any of a variety of useful machine languages. Institution computer 102 is described in further detail with respect to FIG. 1B.

Figure 1B:
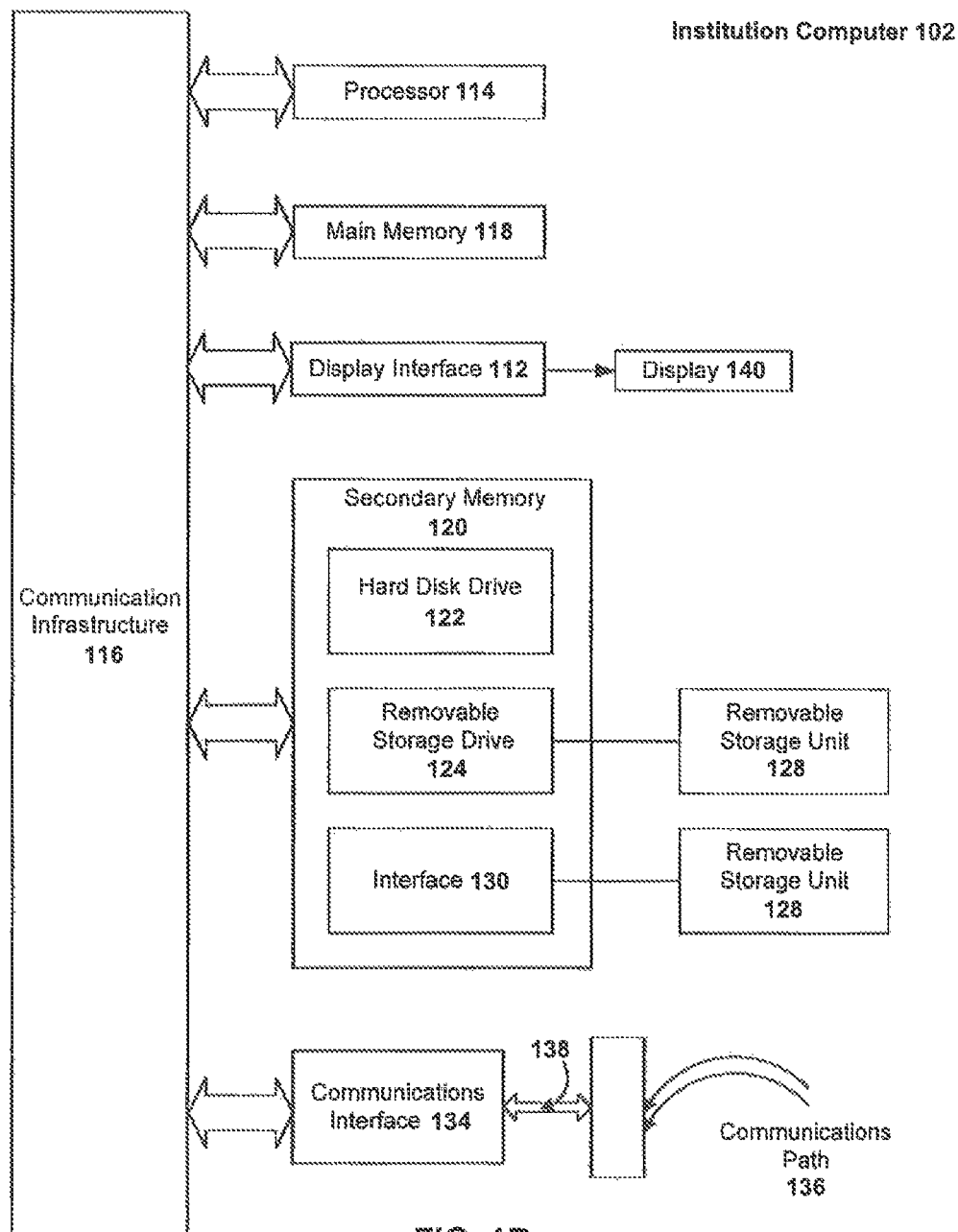

As shown in FIG. 1B, the institution computer 102 includes one or more processors, such as processor 114. The processor 114 is connected to a communication infrastructure 116 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Institution computer 102 can include a display interface 112 that forwards graphics, text, and other data from the communication infrastructure 116 (or from a frame buffer not shown) for display on the display unit 140.

Institution computer 102 also includes a main memory 118, preferably random access memory (RAM), and may also include a secondary memory 120. The secondary memory 120 may include, for example, a hard disk drive 122 and/or a removable storage drive 124, representing a floppy disk drive, a magnetic tape drive, an optical disk drive, etc. The removable storage drive 124 reads from and/or writes to a removable storage unit 128 in a well known manner. Removable storage unit 128 represents a floppy disk, magnetic tape, optical disk, etc. which is read by and written to by removable storage drive 124. As will be appreciated, the removable storage unit 128 includes a computer usable storage medium having stored therein computer software and/or data.

In alternative embodiments, secondary memory 120 may include other similar devices for allowing computer programs or other instructions to be loaded into institution computer 102. Such devices may include, for example, a removable storage unit 128 and an interface 130. Examples of such may include a program cartridge and cartridge interface (such as that found in video game devices), a removable memory chip (such as an erasable programmable read only memory (EPROM), or programmable read only memory (PROM) and associated socket, and other removable storage units 128 and interfaces 130, which allow software and data to be transferred from the removable storage unit 128 to institution computer 102.

Institution computer 102 may also include a communications interface 134. Communications interface 134 allows software and data to be transferred between institution computer 102 and external devices. Examples of communications interface 134 may include a modem, a network interface (such as an Ethernet card), a communications port, a Personal Computer Memory Card International Association (PCMCIA) slot and card, etc. Software and data transferred via communications interface 134 are in the form of signals 138 which may be electronic, electromagnetic, optical or other signals capable of being received by communications interface 134. These signals 138 are provided to communications interface 134 via a communications path (e.g., channel) 136. This channel 136 carries signals 138 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 124 and a hard disk installed in hard disk drive 122. These computer program products provide software to institution computer 102. The invention is directed to such computer program products.

Computer programs (also referred to as computer control logic) are stored in main memory 118 and/or secondary memory 120. Computer programs may also be received via communications interface 134. Such computer programs, when executed, enable the institution computer 102 to perform the features of the present invention, as discussed herein, in particular, the computer programs, when executed, enable the processor 114 to perform the features of the present invention. Accordingly, such computer programs represent controllers of the institution computer 102.

In an embodiment where the invention is implemented using software, the software may be stored in a computer program product and loaded into institution computer 102 using removable storage drive 124, hard drive 122 or communications interface 134. The control logic (software), when executed by the processor 114, causes the processor 114 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The institution computer 102 may in turn be in operative communication with any number of other internal or external computing devices, including for example components 104, 106, 108, and 110, which may be computers or servers of similar or compatible functional configuration. These components 104-110 may gather and provide aggregated and individual consumer data, as described herein, and transmit the same for processing and analysis by the institution computer 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners.

Each of the components 104-110 may be operated by either common or independent entities. In one exemplary embodiment, which is not to be limiting to the scope of the present disclosure, one or more such components 104-110 may be operated by a provider of aggregate and individual consumer tradeline data, an example of which includes services provided by Experian Information Solutions, Inc. of Costa Mesa, Calif. ("Experian"). Tradeline level data preferably includes up to 24 months or more of balance history and credit attributes captured at the tradeline level, including information about accounts as reported by various credit grantors, which in turn may be used to derive a broad view of actual aggregated consumer behavioral spending patterns.

Alternatively, or in addition thereto, one or more of the components 104-110 may likewise be operated by a provider of individual and aggregate consumer panel data, such as commonly provided by comScore Networks, Inc. of Reston, Va. ("comScore"). Consumer panel data provides more detailed and specific consumer spending information regarding millions of consumer panel participants, who provide actual spend data to collectors of such data in exchange for various inducements. The data collected may include any one or more of credit risk scores, online credit card application data, online credit card purchase transaction data, online credit card statement views, credit trade type and credit issuer, credit issuer code, portfolio level statistics, credit bureau reports, demographic data, account balances, credit limits, purchases, balance transfers, cash advances, payment amounts, finance charges, annual percentage interest rates on accounts, and fees charged, all at an individual level for each of the participating panelists. In various embodiments, this type of data is used for model development, refinement and verification. This type of data is further advantageous over tradeline level data alone for such purposes, since such detailed information is not provided at the tradeline level. While such detailed consumer panel data can be used alone to generate a model, it may not be wholly accurate with respect to the remaining marketplace of consumers at large without further refinement. Consumer panel data may also be used to generate aggregate consumer data for model derivation and development.

Additionally, another source of inputs to the model may be internal spend and payment history of the institution's own customers. From such internal data, detailed information at the level of specificity as the consumer panel data may be obtained and used for model development, refinement and validation, including the categorization of consumers based on identified transactor and revolver behaviors.

Figure 2:
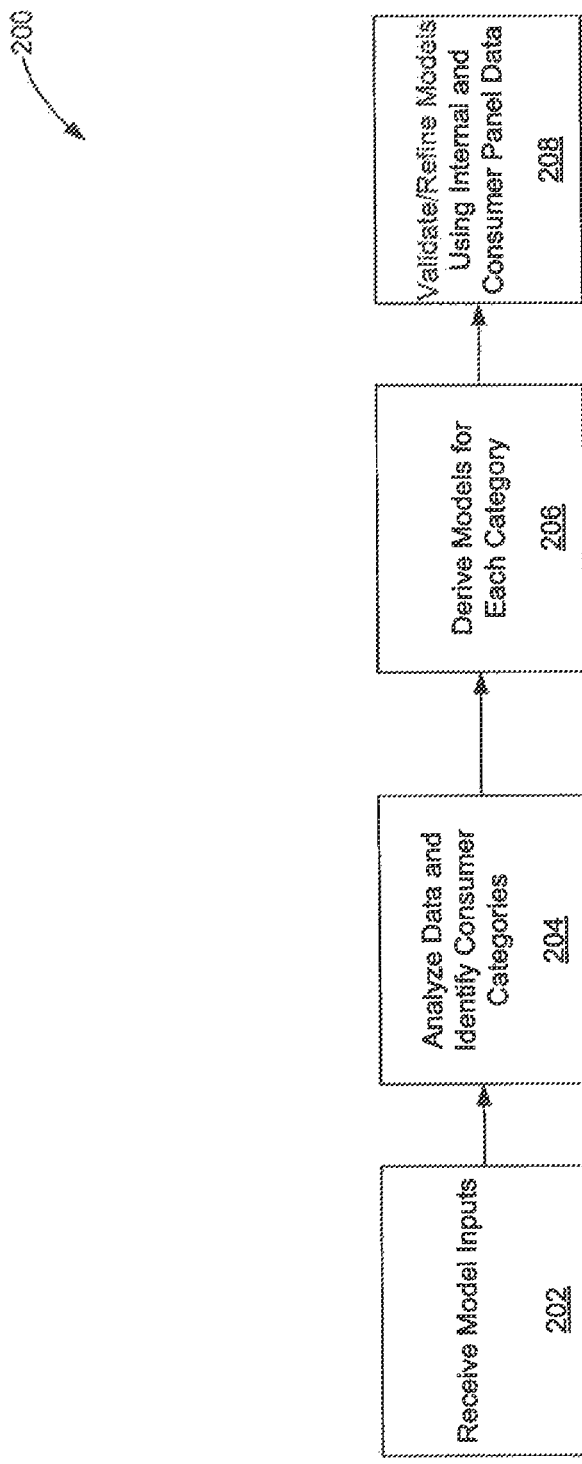
FIG. 2 is a flowchart of an exemplary consumer modeling process performed by the financial server of FIG. 1.

Turning now to FIG. 2, there is depicted a flowchart of an exemplary process 200 for modeling aggregate consumer behavior in accordance with the present disclosure. The process 200 commences at step 202 wherein individual and aggregate consumer data, including time-series tradeline data, consumer panel data and internal customer financial data, is obtained from any of the data sources described previously as inputs for consumer behavior models. In certain embodiments, the individual and aggregate consumer data may be provided in a variety of different data formats or structures and consolidated to a single useful format or structure for processing.

Next, at step 204, the individual and aggregate consumer data is analyzed to determine consumer spending behavior patterns. One of ordinary skill in the art will readily appreciate that the models may include formulas that mathematically describe the spending behavior of consumers. The particular formulas derived will therefore highly depend on the values resulting from customer data used for derivation, as will be readily appreciated. However, by way of example only and based on the data provided, consumer behavior may be modeled by first dividing consumers into categories that may be based on account balance levels, demographic profiles, household income levels or any other desired categories. For each of these categories in turn, historical account balance and transaction information for each of the consumers may be tracked over a previous period of time, such as one to two years. Algorithms may then be employed to determine formulaic descriptions of the distribution of aggregate consumer information over the course of that period of time for the population of consumers examined, using any of a variety of known mathematical techniques. These formulas in turn may be used to derive or generate one or more models (step 206) for each of the categories of consumers using any of a variety of available trend analysis algorithms. The models may yield the following types of aggregated consumer information for each category: average balances, maximum balances, standard deviation of balances, percentage of balances that change by a threshold amount, and the like.

Finally, at step 208, the derived models may be validated and periodically refined using internal customer data and consumer panel data from sources such as comScore. In various embodiments, the model may be validated and refined over time based on additional aggregated and individual consumer data as it is continuously received by an institution computer 102 over the network 100. Actual customer transaction level information and detailed consumer information panel data may be calculated and used to compare actual consumer spend amounts for individual consumers (defined for each month as the difference between the sum of debits to the account and any balance transfers into the account) and the spend levels estimated for such consumers using the process 200 above. If a large error is demonstrated between actual and estimated amounts, the models and the formulas used may be manually or automatically refined so that the error is reduced. This allows for a flexible model that has the capability to adapt to actual aggregated spending behavior as it fluctuates over time.

Figure 3:
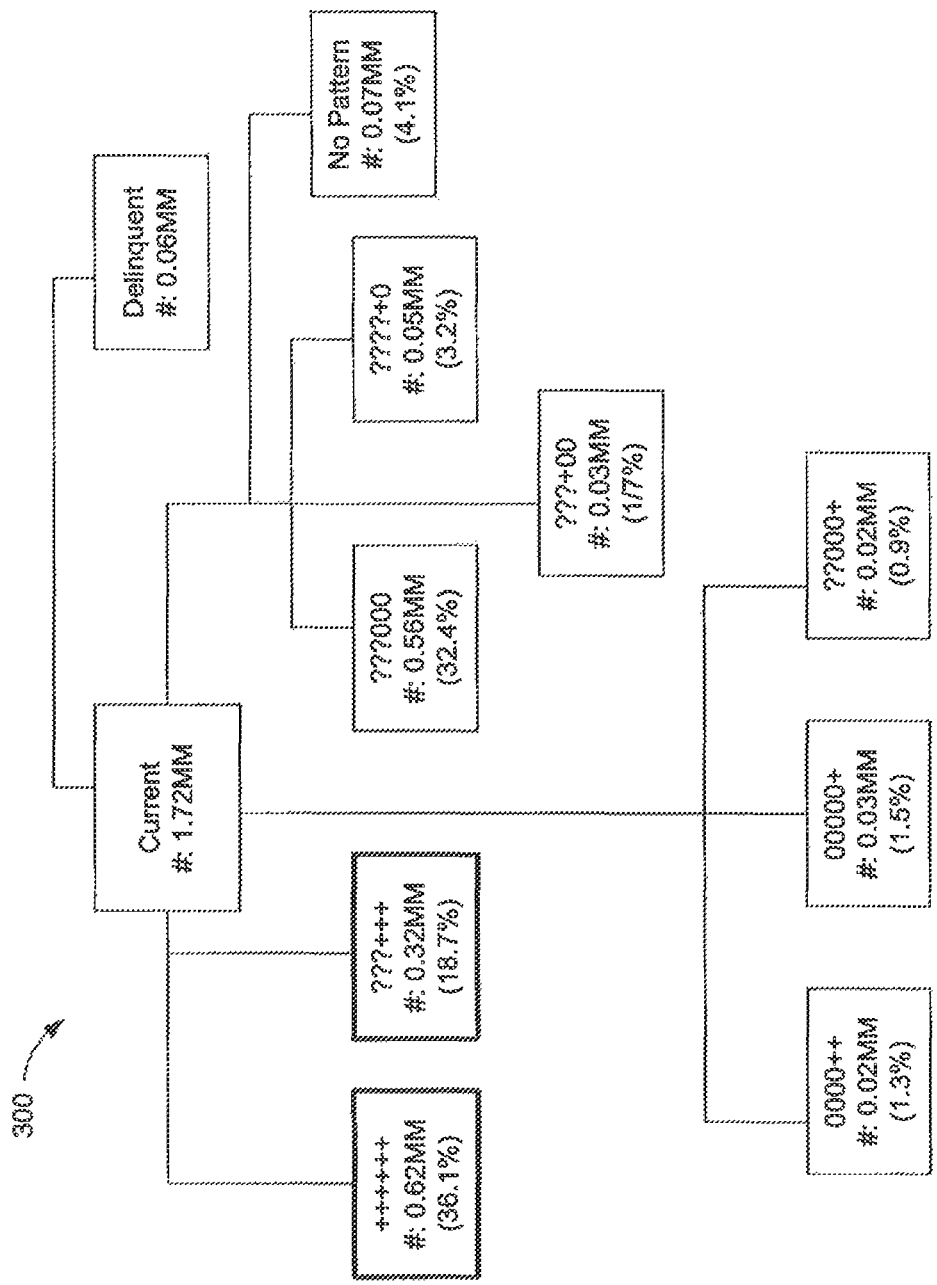
FIG. 3 is a diagram of exemplary categories of consumers examined during the process of FIG. 2.

As shown in the diagram 300 of FIG. 3, a population of consumers for which individual and/or aggregated data has been provided may be divided first into two general categories for analysis, for example, those that are current on their credit accounts (representing 1.72 million consumers in the exemplary data sample size of 1.78 million consumers) and those that are delinquent (representing 0.06 million of such consumers). In one embodiment, delinquent consumers may be discarded from the populations being modeled.

In further embodiments, the population of current consumers is then subdivided into a plurality of further categories based on the amount of balance information available and the balance activity of such available data. In the example shown in the diagram 300, the amount of balance information available is represented by string of '+' '0' and '?' characters. Each character represents one month of available data, with the rightmost character representing the most current months and the leftmost character representing the earliest month for which data is available. In the example provided in FIG. 3, a string of six characters is provided, representing the six most recent months of data for each category. The "+" character represents a month in which a credit account balance of the consumer has increased. The "0" character may represent months where the account balance is zero. The "?" character represents months for which balance data is unavailable. Also provided the diagram is number of consumers fallen to each category and the percentage of the consumer population they represent in that sample.

In further embodiments, only certain categories of consumers may be selected for modeling behavior. The selection may be based on those categories that demonstrate increased spend on their credit balances over time. However, it should be readily appreciated that other categories can be used. FIG. 3 shows the example of two categories of selected consumers for modeling in bold. These groups show the availability of at least the three most recent months of balance data and that the balances increased in each of those months.

Figure 4:
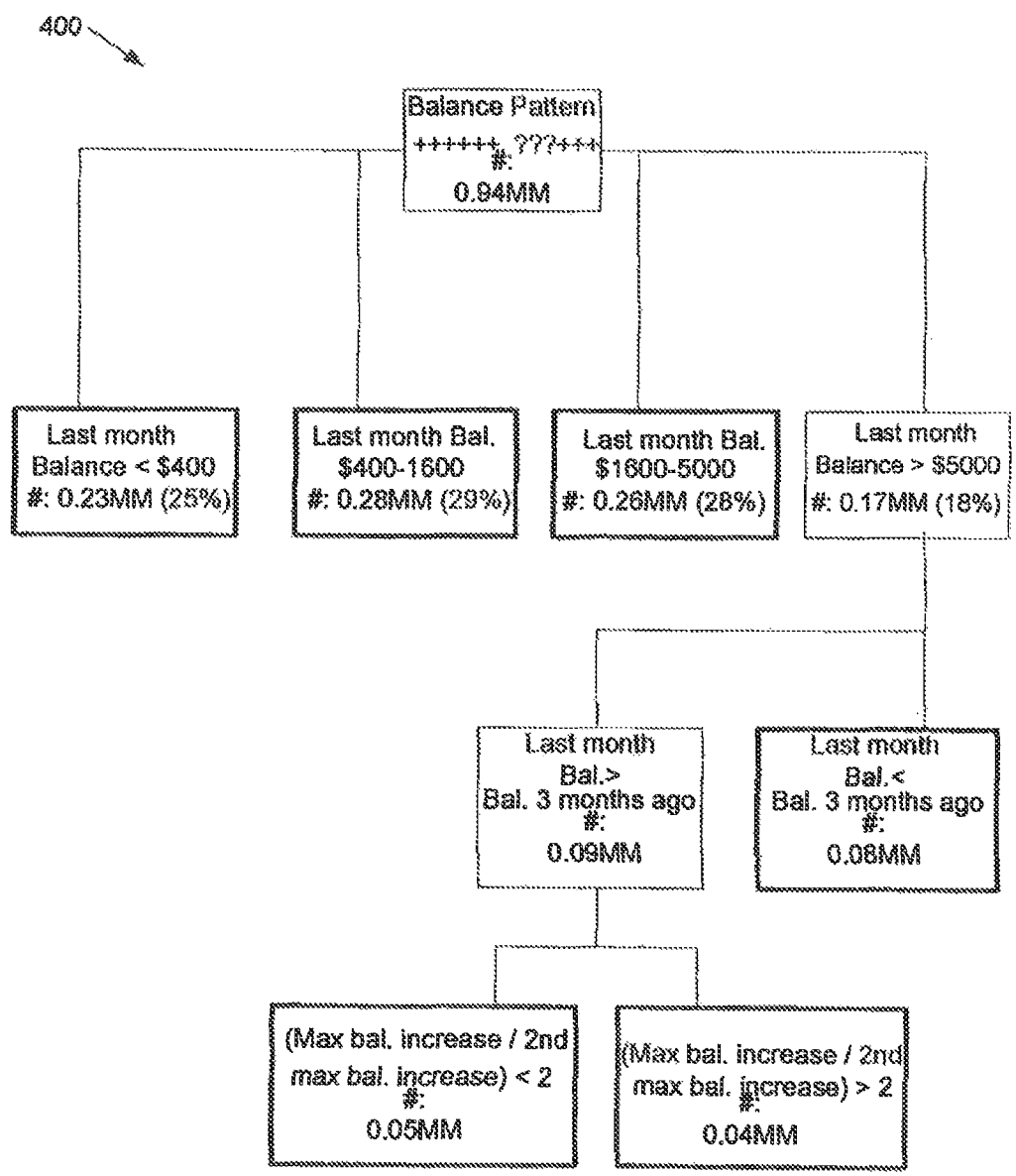
FIG. 4 is a diagram of exemplary subcategories of consumers modeled during the process of FIG. 2.

Turning now to FIG. 4, therein is depicted an exemplary diagram 400 showing sub-categorization of the two categories of FIG. 3 in bold that are selected for modeling. In the embodiment shown, the sub-categories may include: consumers having a most recent credit balance less than $400; consumers having a most recent credit balance between $400 and $1600; consumers having a most recent credit balance between $1600 and $5000; consumers whose most recent credit balance is less than the balance of, for example, three months ago; consumers whose maximum credit balance increase over, for example, the last twelve months divided by the second highest maximum balance increase over the same period is less than 2; and consumers whose maximum credit balance increase over the last twelve months divided by the second highest maximum balance increase is greater than 2. It should be readily appreciated that other subcategories can be used. Each of these sub-categories is defined by their last month balance level. The number of consumers from the sample population (in millions) and the percentage of the population for each category are also shown in FIG. 4.

There may be a certain balance threshold established, wherein if a consumer's account balance is too high, their behavior may not be modeled, since such consumers are less likely to have sufficient spending ability. Alternatively, or in addition thereto, consumers having balances above such threshold may be sub-categorized yet again, rather than completely discarded from the sample. In the example shown in FIG. 4, the threshold value may be $5000, and only those having particular historical balance activity may be selected, i.e. those consumers whose present balance is less than their balance three months earlier, or whose maximum balance increase in the examined period meets certain parameters. Other threshold values may also be used and may be dependent on the individual and aggregated consumer data provided.

As described in the foregoing, the models generated in the process 200 may be derived, validated and refined using tradeline and consumer panel data. An example of tradeline data 500 from Experian and consumer panel data 502 from comScore are represented in FIG. 5. Each row of the data 500, 502 represents the record of one consumer and thousands of such records may be provided at a time. The statement 500 shows the point-in-time balance of consumers accounts for three successive months (Balance 1, Balance 2 and Balance 3). The data 502 shows each consumer's purchase volume, last payment amount, previous balance amount and current balance. Such information may be obtained, for example, by page scraping the data (in any of a variety of known manners using appropriate application programming interfaces) from an Internet web site or network address at which the data 502 is displayed. Furthermore, the data 500 and 502 may be matched by consumer identity and combined by one of the data providers or another third party independent of the financial institution. Validation of the models using the combined data 500 and 502 may then be performed, and such validation may be independent of consumer identity.

Figure 6:
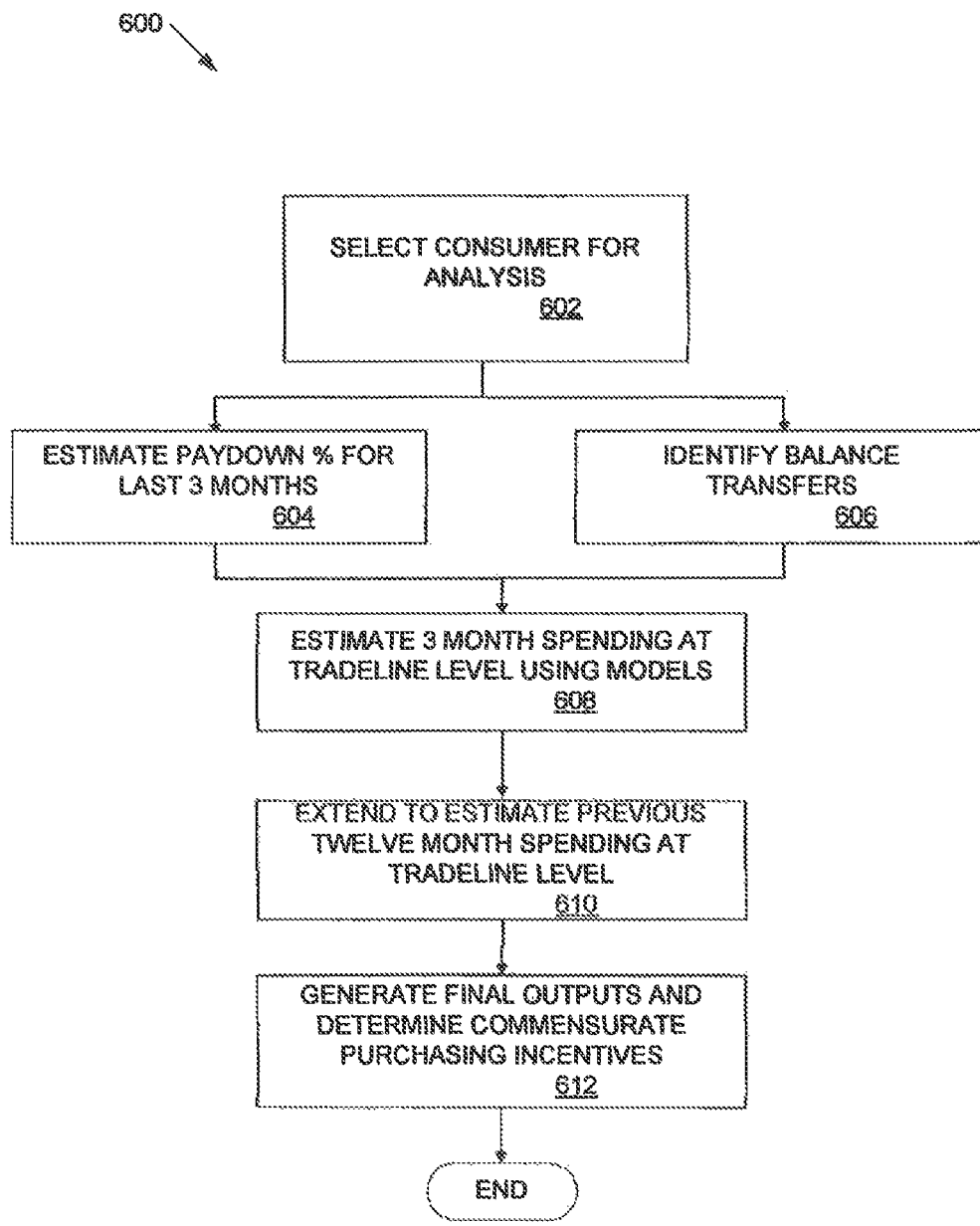
FIG. 6 is a flowchart of an exemplary process for estimating the spend ability of a consumer, performed by the financial server of FIG. 1.

Turning now to FIG. 6, therein is depicted an exemplary process 600 for estimating the size of an individual consumer's spending wallet. Upon completion of the modeling of the consumer categories above, the process 600 commences with the selection of individual consumers or prospects to be examined (step 602). An appropriate model derived during the process 200 will then be applied to the presently available consumer tradeline information in the following manner to determine, based on the results of application of the derived models, an estimate of a consumer's size of wallet. Each consumer of interest may be selected based on their falling into one of the categories selected for modeling described above, or may be selected using any of a variety of criteria.

The process 600 continues to step 604 where, for a selected consumer, a paydown percentage over a previous period of time is estimated for each of the consumer's credit accounts. In one embodiment, the paydown percentage is estimated over the previous three-month period of time based on available tradeline data, and may be calculated according to the following formula:

> Pay-down %=(The sum of the last three months payments from the account)/(The sum of three month balances for the account based on tradeline data).

The paydown percentage may be set to, for example, 2%, for any consumer exhibiting less than a 5% paydown percentage, and may be set to 100% if greater than 80%, as a simplified manner for estimating consumer spending behaviors on either end of the paydown percentage scale.

Consumers that exhibit less than a 50% paydown during this period may be categorized as revolvers, while consumers that exhibit a 50% paydown or greater may be categorized as transactors. These categorizations may be used to initially determine what, if any, purchasing incentives may be available to the consumer, as described later below.

The process 600, then continues to step 606, where balance transfers for a previous period of time are identified from the available tradeline data for the consumer. The identification of balance transfers are essential since, although tradeline data may reflect a higher balance on a credit account over time, such higher balance may simply be the result of a transfer of a balance into the account, and are thus not indicative of a true increase in the consumer's spending. It is difficult to confirm balance transfers based on tradeline data since the information available is not provided on a transaction level basis. In addition, there are typically lags or absences of reporting of such values on tradeline reports.

Nonetheless, marketplace analysis using confirmed consumer panel and internal customer financial records has revealed reliable ways in which balance transfers into an account may be identified from imperfect individual tradeline data alone. Three exemplary reliable methods for identifying balance transfers from credit accounts, each which is based in part on actual consumer data sampled, are as follows. It should be readily apparent that these formulas in this form are not necessary for all embodiments of the present process and may vary based on the consumer data used to derive them.

A first rule identifies a balance transfer for a given consumer's credit account as follows. The month having the largest balance increase in the tradeline data, and which satisfies the following conditions, may be identified as a month in which a balance transfer has occurred:

> The maximum balance increase is greater than twenty times the second maximum balance increase for the remaining months of available data;
> The estimated pay-down percent calculated at step 306 above is less than 40%; and
> The largest balance increase is greater than $1000 based on the available data.

A second rule identifies a balance transfer for a given consumer's credit account in any month where the balance is above twelve times the previous month's balance and the next month's balance differs by no more than 20%.

A third rule identifies a balance transfer for a given consumer's credit account in any month where:

> the current balance is greater than 1.5 times the previous month's balance;
> the current balance minus the previous month's balance is greater than $4500; and
> the estimated paydown percent from step 306 above is less than 30%.

The process 600 then continues to step 608, where consumer spend on each credit account is estimated over the next, for example, three month period. In estimating consumer spend, any spending for a month in which a balance transfer has been identified from individual tradeline data above is set to zero for purposes of estimating the size of the consumer's spending wallet, reflecting the supposition that no real spending has occurred on that account. The estimated spend for each of the three previous months may then be calculated as follows:

> Estimated spend=(the current balance−the previous month's balance+(the previous month's balance*the estimated pay-down % from step 604 above).

The exact form of the formula selected may be based on the category in which the consumer is identified from the model applied, and the formula is then computed iteratively for each of the three months of the first period of consumer spend.

Next, at step 610 of the process 600, the estimated spend is then extended over, for example, the previous three quarterly or three-month periods, providing a most-recent year of estimated spend for the consumer.

Finally, at step 612, this in turn may be used to generate a plurality of final outputs for each consumer account (step 314). These may be provided in an output file that may include a portion or all of the following exemplary information, based on the calculations above and information available from individual tradeline data: (i) size of previous twelve month spending wallet; (ii) size of spending wallet for each of the last four quarters; (iii) total number of revolving cards, revolving balance, and average pay down percentage for each; (iv) total number of transacting cards, and transacting balances for each; (v) the number of balance transfers and total estimated amount thereof; (vi) maximum revolving balance amounts and associated credit limits; and (vii) maximum transacting balance and associated credit limit.

After step 612, the process 600 ends with respect to the examined consumer. It should be readily appreciated that the process 600 may be repeated for any number of current customers or consumer prospects.

Figure 7:
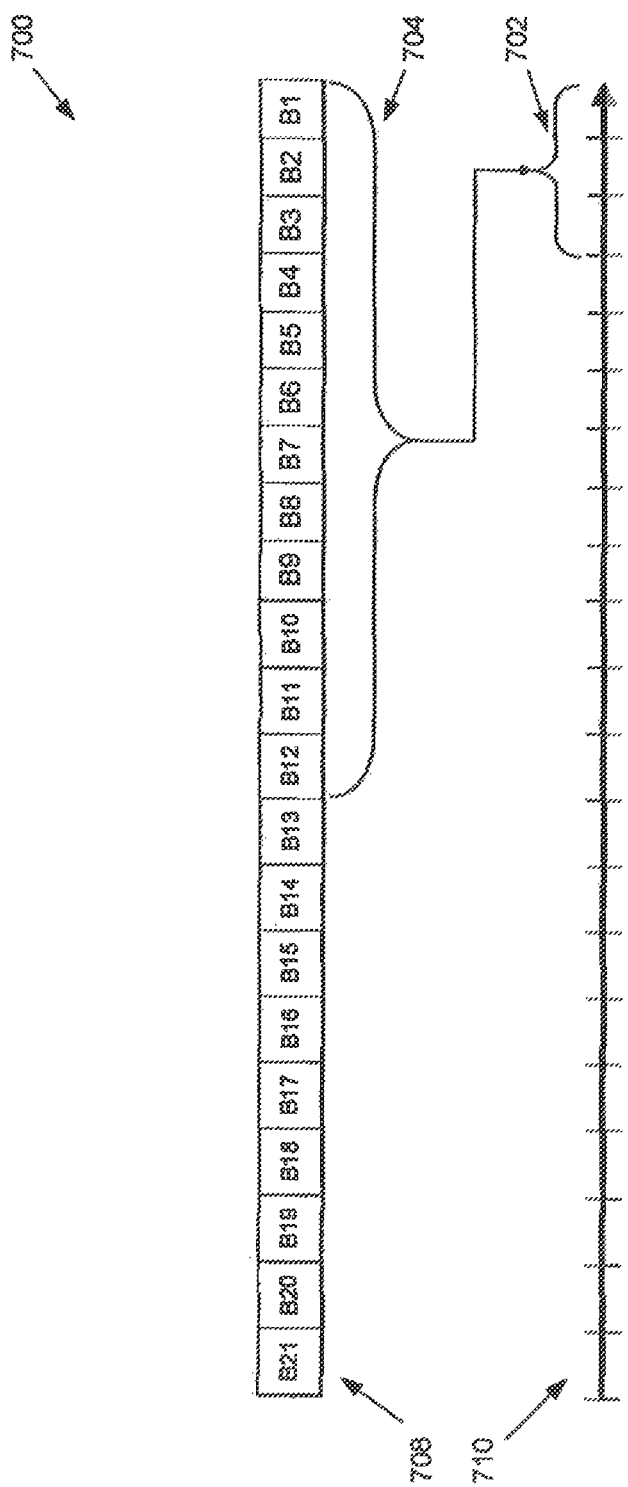
FIG. 7-10 are exemplary timelines showing the rolling time periods for which individual customer data is examined during the process of FIG. 6.

Referring now to FIGS. 7-10, therein is depicted illustrative diagrams 700-1000 of how such estimated spending is calculated in a rolling manner across each previous three month (quarterly) period. In FIG. 7, there is depicted a first three month period (i.e., the most recent previous quarter) 702 on a timeline 710. As well, there is depicted a first twelve-month period 704 on a timeline 708 representing the last twenty-one months of point-in-time account balance information available from individual tradeline data for the consumer's account. Each month's balance for the account is designated as "B#." B1-B12 represent actual account balance information available over the past twelve months for the consumer. B13-B21 represent consumer balances over consecutive, preceding months.

In accordance with the diagram 700, spending in each of the three months of the first quarter 702 is calculated based on the balance values B1-B12, the category of the consumer based on consumer spending models generated in the process 200, and the formulas used in steps 604 and 606.

Figure 8:
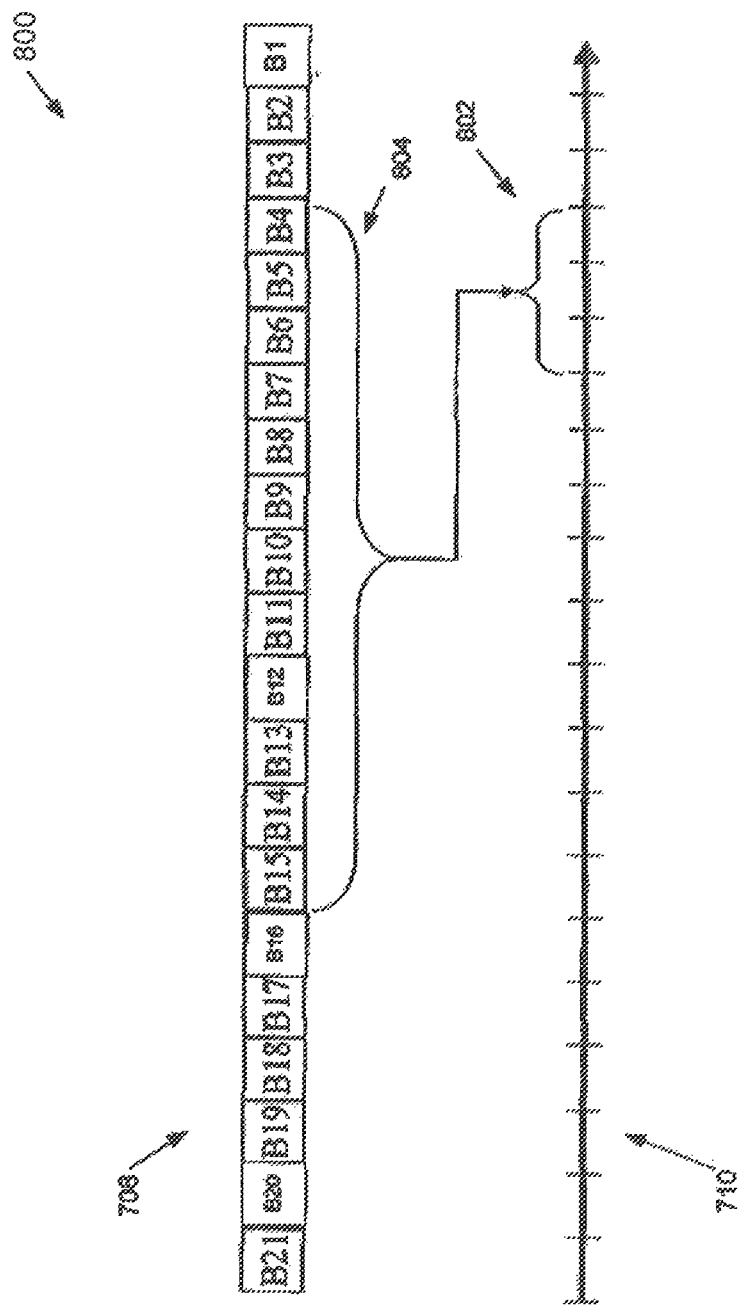

Turning now to FIG. 8, there is shown a diagram 800 illustrating the balance information used for estimating spending in a second previous quarter 802 using a second twelve-month period of balance information 804. Spending in each of these three months of the second previous quarter 802 is based on known balance information B4-B15.

Figure 9:
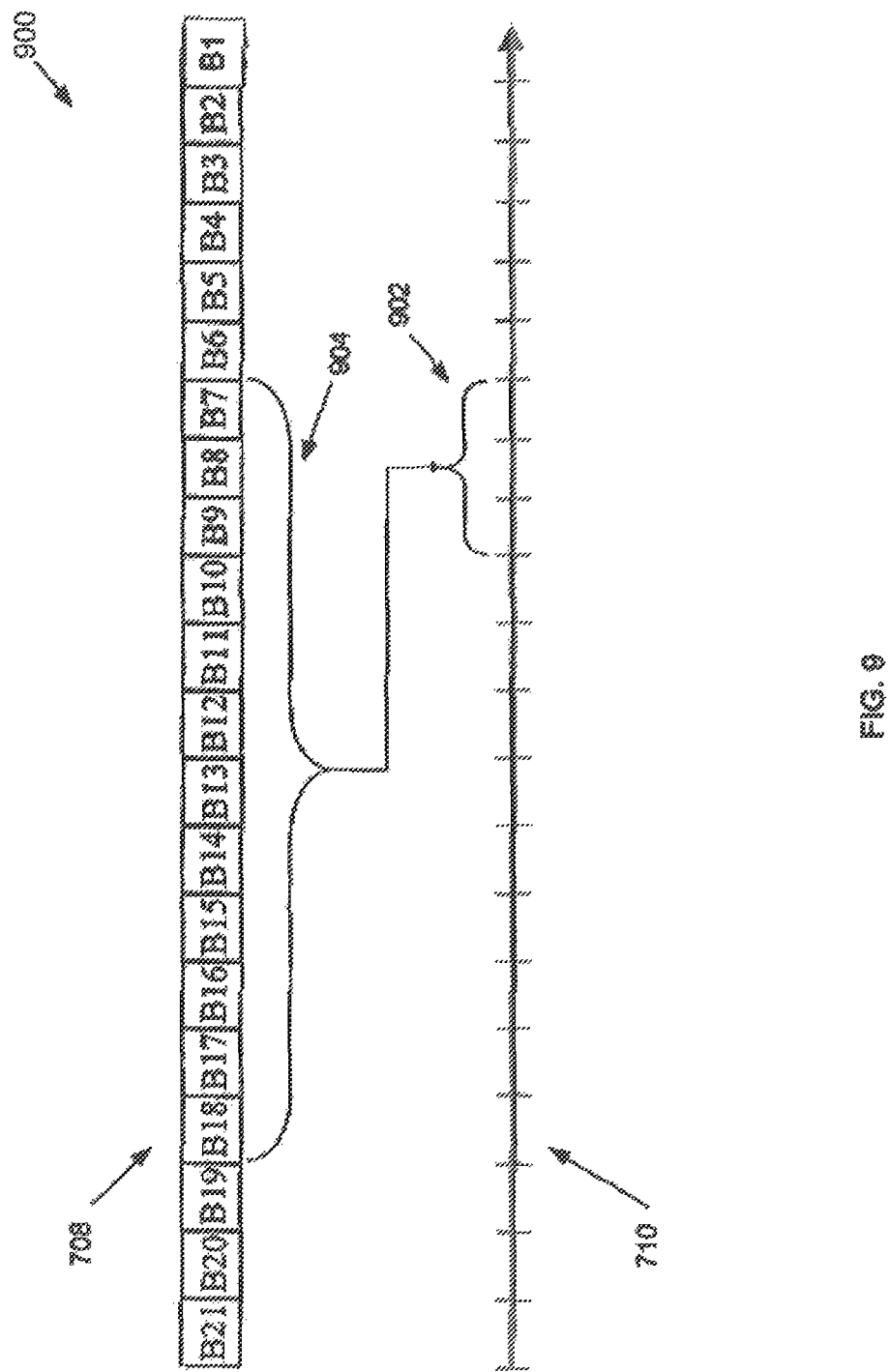

Turning now to FIG. 9, there is shown a diagram 900 illustrating the balance information used for estimating spending in a third successive quarter 902 using a third twelve-month period of balance information 904. Spending in each of these three months of the third previous quarter 902 is based on known balance information B7-B18.

Figure 10:
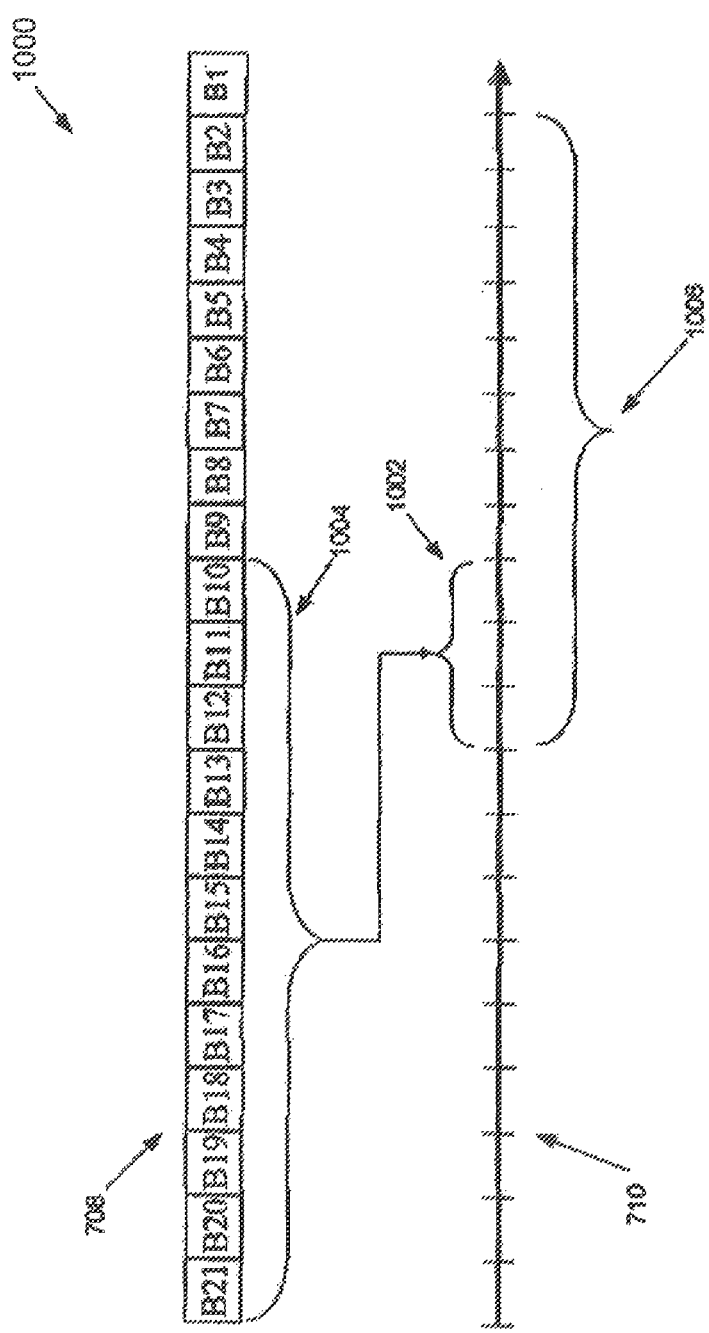

Turning now to FIG. 10, there is shown a diagram 1000 illustrating the balance information used for estimating spending in a fourth previous quarter 1002 using a fourth twelve-month period of balance information 1004. Spending in each of these three months of the fourth previous quarter 1002 is based on balance information B10-B21.

It should be readily appreciated that as the rolling calculations proceed, the consumer's category may change based on the outputs that result, and, therefore, different formula corresponding to the new category may be applied to the consumer for different periods of time. The rolling manner described above maximizes the known data used for estimating consumer spend in a previous twelve month period 1006.

Based on the final output generated for the customer, commensurate purchasing incentives may be identified and provided to the consumer, for example, in anticipation of an increase in the consumer's purchasing ability as projected by the output file. In such cases, consumers of good standing, who are categorized as transactors with a protected increase in purchasing ability, may be offered a lower financing rate on purchases made during the period of expected increase in their purchasing ability, or may be offered a discount or rebate for transactions with selected merchants during that time.

In another example, and in the case where a consumer is a revolver, such consumer with a projected increase in purchasing ability may be offered a lower annual percentage rate on balances maintained on their credit account.

Other like promotions and enhancements to consumers' experiences are well known and may be used within the processes disclosed herein.

Various statistics for the accuracy of the processes 200 and 600 are provided in FIGS. 11-18, for which a consumer sample was analyzed by the process 200 and validated using 24 months of historic actual spend data. The table 1100 of FIG. 11 shows the number of consumers having a balance of $5000 or more for whom the estimated paydown percentage (calculated in step 604 above) matched the actual paydown percentage (as determined from internal transaction data and external consumer panel data).

The table 1200 of FIG. 12 shows the number of consumers having a balance of $5000 or more who were expected to be transactors or revolvers, and who actually turned out to be transactors and revolvers based on actual spend data. As can be seen, the number of expected revolvers who turned out to be actual revolvers (80539) was many tithes greater than the number of expected revolvers who turned out to be transactors (1090). Likewise, the number of expected and actual transactors outnumbered by nearly four-to-one the number of expected transactors that turned out to be revolvers.

The table 1300 of FIG. 13 shows the number of estimated versus actual instances in the consumer sample of when there occurred a balance transfer into an account. For instance, in the period sampled, there were 148,326 instances where no balance transfers were identified in step 606 above, and for which a comparison of actual consumer data showed there were in fact no balance transfers in. This compares to only 9,534 instances where no balance transfers were identified in step 606, but there were in fact actual balance transfers.

The table 1400 of FIG. 14 shows the accuracy of estimated spending (in steps 608-612) versus actual spending for consumers with account balances (at the time this sample testing was performed) greater than $5000. As can be seen, the estimated spending at each spending level most closely matched the same actual spending level than for any other spending level in nearly all instances.

The table 1500 of FIG. 15 shows the accuracy of estimated spending (in steps 608-612) versus actual spending for consumers having most recent account balances between $1600 and $5000. As can be readily seen, the estimated spending at each spending level most closely matched the same actual spending level than for any other spending level in all instances.

The table 1600 of FIG. 16 shows the accuracy of estimated spending versus actual spending for all consumers in the sample. As can be readily seen, the estimated spending at each spending level most closely matched the same actual spending level than for any other actual spending level in all instances.

The table 1700 of FIG. 17 shows the rank order of estimated versus actual spending for all consumers in the sample. This table 1700 readily shows that the number of consumers expected to be in the bottom 10% of spending most closely matched the actual number of consumers in that category, by 827,716 to 22,721. The table 1700 further shows that the number of consumers expected to be in the top 10% of spenders most closely matched the number of consumers who were actually in the top 10%, by 71,773 to 22,721.

The table 1800 of FIG. 18 shows estimated versus actual annual spending for all consumers in the sample over the most recent year of available data. As can be readily seen, the expected number of consumers at each spending level most closely matched the same actual spending level than any other level in all instances.

Finally, the table 1900 of FIG. 19 shows the rank order of estimated versus actual total annual spending for all the consumers over the most recent year of available data. Again, the number of expected consumers in each rank most closely matched the actual rank than any other rank.

Prospective customer populations used for modeling and/or later evaluation may be provided from any of a plurality of available marketing groups, or may be culled from credit bureau data, targeted advertising campaigns or the like. Testing and analysis may be continuously performed to identify the optimal placement and required frequency of such sources for using the size of spending wallet calculations. The processes described herein may also be used to develop models for predicting a size of wallet for an individual consumer.

Institutions adopting the processes disclosed herein may expect to more readily and profitably identify opportunities for prospect and customer offerings, which in turn provides enhanced experiences across all parts of a customer's lifecycle. In the case of a credit provider, accurate identification of spend opportunities allows for rapid provisioning of card member offerings to increase spend that, in turn, results in increased transaction fees, interest charges and the like. The careful selection of customers to receive such offerings reduces the incidence of fraud that may occur in less disciplined card member incentive programs. This, in turn, reduces overall operating expenses for institutions.

III. Household Size of Wallet

In addition to determining the size of wallet of a single consumer, the above process may also be used in determining the size of wallet of a given household. Determining the size of wallet of a household allows a financial institution to more accurately estimate the spend opportunity associated with an individual than would be estimated from the individual's size of wallet alone. For example, two example consumers may have the same individual size of wallet. However, one consumer is single and lives alone, but the other consumer is married to a spouse whose size of wallet is twice as big as the second consumer. The second consumer thus has more spending potential than the first, even though they look very similar when standing alone.

Figure 20:
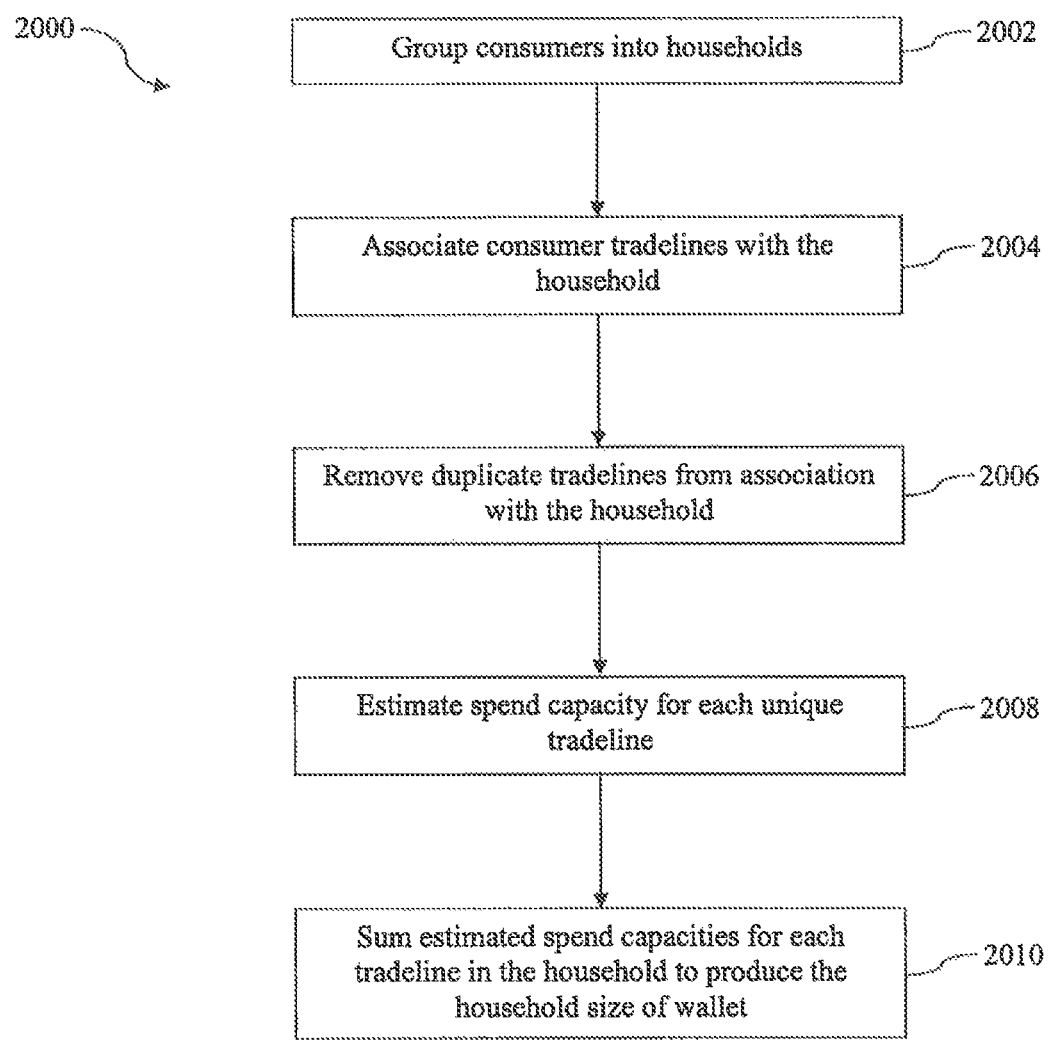
FIG. 20 is a flowchart of an exemplary method for determining a household size of wallet.

FIG. 20 is a flowchart of an exemplary method 2000 of determining the size of wallet of an entire household. In step 2002, individual consumers are grouped into households. A household may include, for example, all people with credit bureau history that live at the same address. Such individuals do not necessarily need to have the same last name. The grouping may exclude certain people, such as those under the age of 18, or those who have opted out of direct marketing campaigns.

In step 2004, once individual consumers are grouped into a household, tradelines held by one or more of the consumers in the household are identified and associated with the household. The tradelines may be determined using, for example and without limitation, credit bureau data and internal records of the financial institution.

In step 2006, duplicate tradelines are identified and removed from association with the household, such that only unique trades remain associated with the household. Duplicates occur when the basic user of an account shares a household with a supplemental user of the same account. To identify duplicate tradelines, the history is obtained for every tradeline associated with the household. The history may be limited to a given timeframe, such as the previous 24 months. This history may include, for example and without limitation, account balance and transaction information. The histories of the tradelines are then compared to determine if any tradeline in the household has the same historical performance as another tradeline in the household. If two tradelines are identified as having the same historical performance, one of the tradelines is determined to be a duplicate, and is not considered in the household size of wallet calculation.

In step 2008, an estimated spend capacity for each of the remaining, unique tradelines is calculated based on the balance of the tradeline. The estimated spend capacity may be calculated, for example, as described with respect to method 600 (FIG. 6) above.

In step 2010, the estimated spend capacities of the unique tradelines in the household are summed. The resulting combined spend capacity is output as the household size of wallet. The household size of wallet can then be associated with each individual consumer in the household.

Once individual consumers are tagged with or otherwise identified by their household size of wallet, a financial institution can more accurately categorize the consumers and provide the consumers with more relevant offers. For example, based on the household size of wallet calculated for an existing customer, purchasing incentives may be identified and provided to the existing customer to encourage spend on an existing account. In another example, prospective customers may be targeted based on their own specific household sizes of wallet and/or spend characteristics of other consumers in their household. In this example, a prospective cardholder whose household size of wallet is significantly higher than his individual size of wallet is expected to have high spend and a high response rate to product offers. Similarly, a prospective cardholder that lives in the same household as a high spend, low risk card holder is expected to be high spend and low risk as well. Such targeting encourages spend by prospective cardholders on new accounts.

Figure 21:
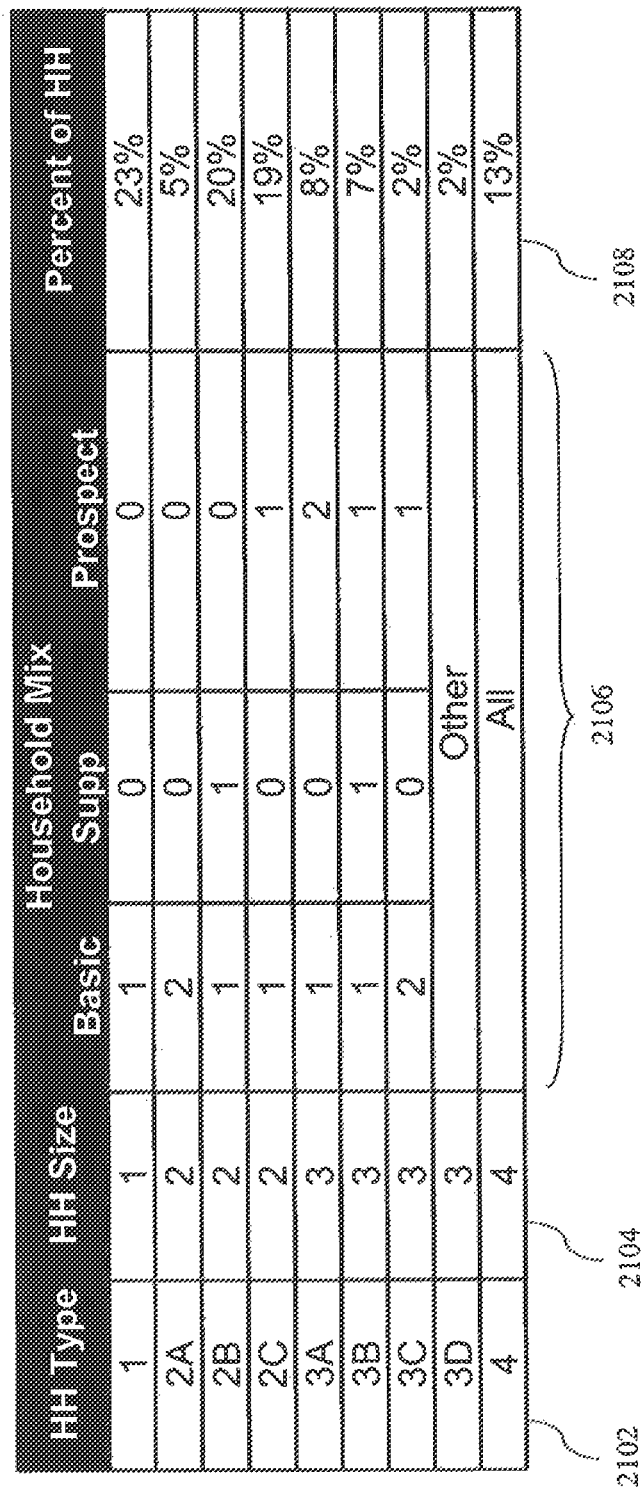
FIG. 21 is a chart identifying various example household types.

Categorizing consumers by household type reveals trends which can be used to identify low risk prospects without completing size of wallet analyses for each specific prospect. The household size and mix of consumers therein defines a household type. FIG. 21 is a chart identifying various household types 2102. Each household type 2102 has a particular size 2104 and a particular mix 2106. Size 2104 corresponds to the number of consumers in the household. Mix 2106 corresponds to the number of basic cardholders, supplemental cardholders, and prospective cardholders in the household. Each household type makes up a percentage 2108 of all households.

Figure 22:
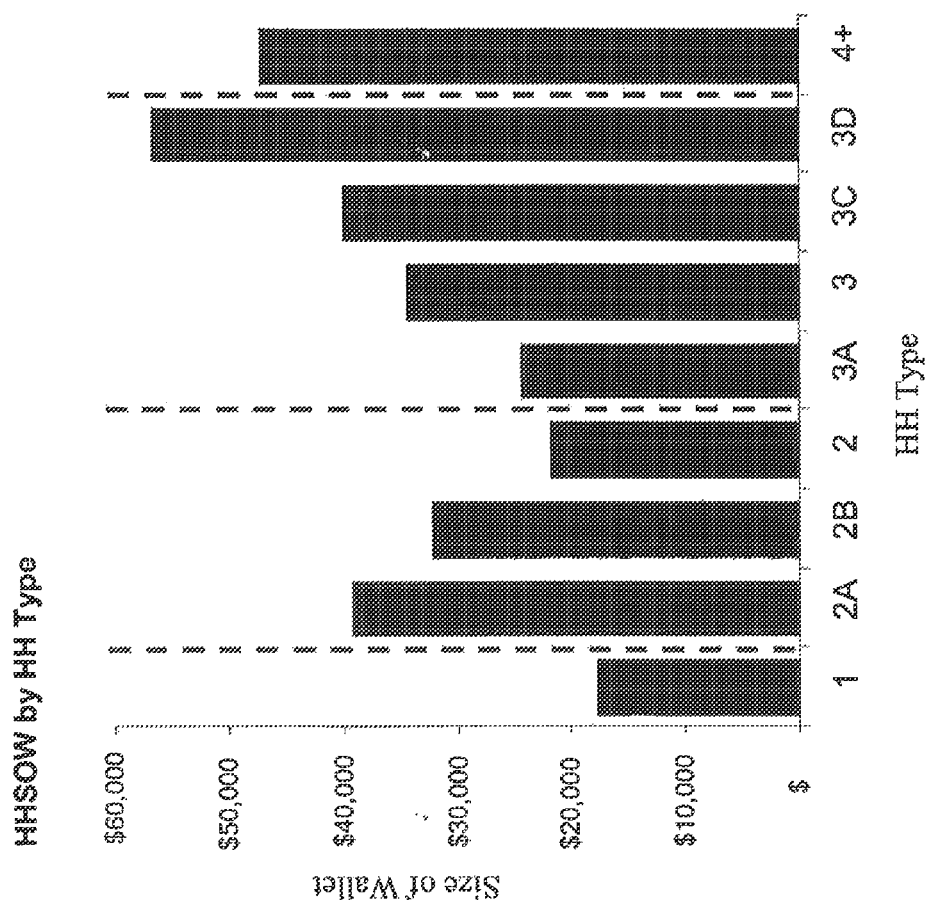
FIG. 22 is a chart illustrating average sizes of wallet by household type.

FIG. 22 illustrates average sizes of wallet by household type. As would be expected, household size of wallet increases as the number of people in a household increases, and depends on the mix of consumers in the household. Of households with two people, for example, those having two basic cardholders (type 2A) tend to have the largest wallet, while households having one basic cardholder and one prospective cardholder (type 2C) tend to have the smallest wallet. In another example, of households with three people, those having two basic cardholders and one prospective cardholder (type 3C) tend to have the largest wallets (excluding the "other" category), while households having one basic cardholder and two prospective cardholders (type 3A) tend to have the smallest wallets.

By identifying the types of households having the largest wallets, a financial institution can target consumers in those household types with new product offers and/or incentives on existing products to encourage spend with the financial institution by the consumers. For example, the financial institution can target prospective cardholders of all type-2A households with an offer for a new card product that suits their needs, since those cardholders are the most likely to accept such an offer while maintaining a low risk of default.

Figure 23:
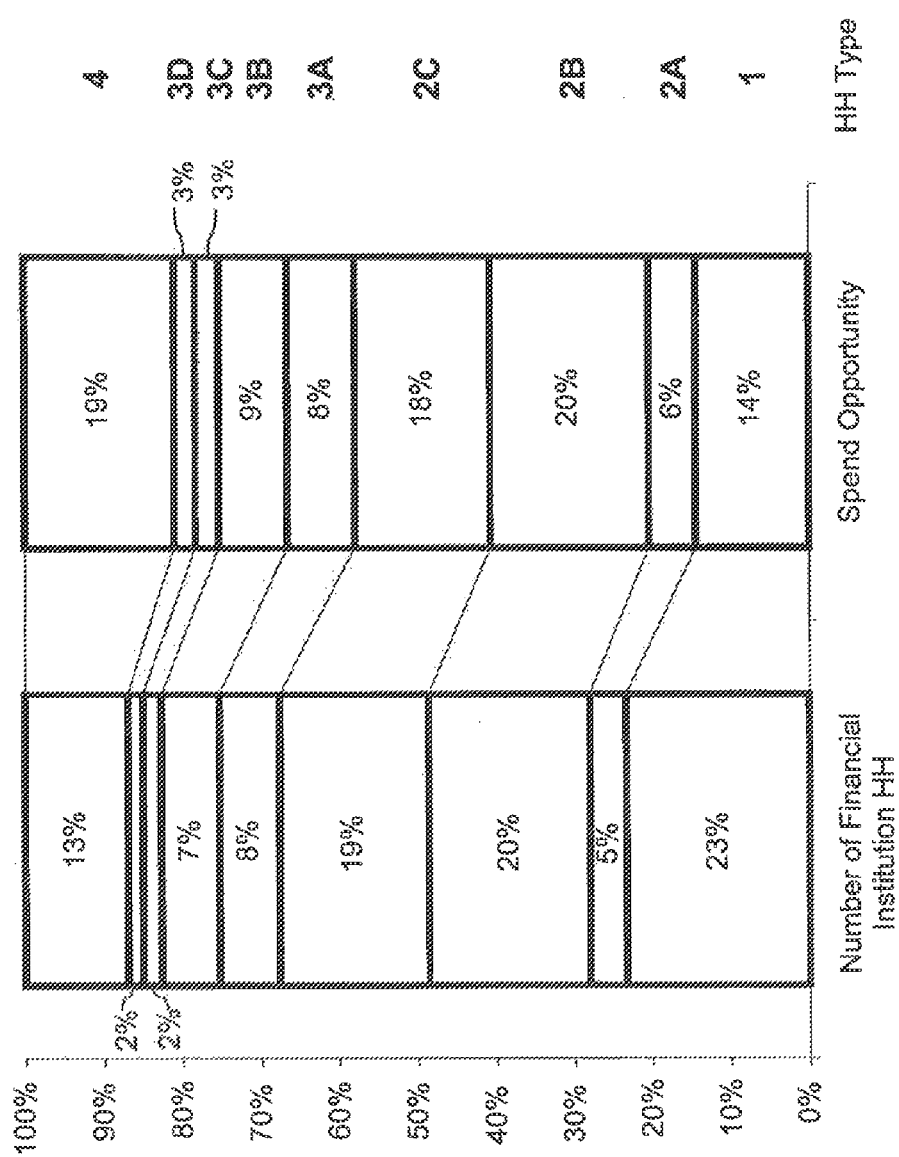
FIG. 23 is a chart illustrating spend opportunity based on an exemplary share of wallet distribution.

Once the size of wallet has been determined for a given household, the share of the household wallet held by a particular financial institution can also be determined. The share of wallet is the percentage of the total size of wallet that is associated with the financial institution and can typically be determined, for example, from the internal records of the financial institution. By identifying households where the financial institution has only a small share of the household size of wallet, the financial institution can determine which households offer the best prospects for spending growth. This is referred to as the spend opportunity. Households having a large spend opportunity can then be targeted for product offers and incentives to increase spend by the consumer with the financial institution. For example, for a financial institution having the exemplary share of household wallet distribution illustrated in FIG. 23, the greatest spend opportunity is available in households having one basic cardholder and one supplemental cardholder (type 2B) and households having one basic cardholder and one prospective cardholder (type 2C).

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   extracting, by a computer-based system and using a first application programming interface (API) having continuous access, current spending data for a consumer from a transaction processing system internet website that processed the spending data for the consumer;
   extracting, by the computer-based system and using a second API having continuous access, current consumer panel data from consumer research companies' internet websites;
   extracting, by the computer-based system and using a third API having continuous access, current consumer tradeline data from consumer credit companies' internet websites,
   wherein the extracting steps provide continuous access to the current spending data, the current consumer panel data, and the current consumer tradeline data;
   modeling, by the computer-based system, consumer behavior and attributes including the consumer panel data and the consumer tradeline data, by using time series tradeline data and raw tradeline data;
   enhancing, by the computer-based system, validation and refinement of an accuracy of the modeling via the continuous access to the current spending data, the current consumer panel data and the current consumer tradeline data;
   verifying, by the computer-based system and periodically on an ongoing basis, an applicability of the modeling to the consumer;
   determining, by the computer-based system and based on the modeling, a plurality of tradelines using point in time balance information;
   associating, by the computer-based system, the plurality of tradelines with a household of the consumer;
   removing, by the computer-based system, tradelines associated with a supplemental consumer in the plurality of tradelines from consideration in calculating a household size of wallet of the consumer, to create a subset of tradelines; and
   calculating, by the computer-based system, the household size of wallet based on the subset of tradelines.

2. The method of claim 1, wherein the removing is also based on comparing histories of tradelines.

3. The method of claim 1, wherein the removing is also based on comparing histories of tradelines within a time period.

4. The method of claim 1, wherein the removing comprises determining tradelines associated with the supplemental consumer based on comparing histories of tradelines.

5. The method of claim 1, wherein the tradelines associated with the supplemental consumer comprise duplicate tradelines.

6. The method of claim 1, wherein the removing is also based on comparing histories of tradelines, and wherein the histories of tradelines include at least one of account balance or transaction information.

7. The method of claim 1, further comprising estimating, by the computer-based system, a spend capacity for each tradeline within the subset of tradelines.

8. The method of claim 1, wherein the calculating step comprises summing spend capacities for each tradeline within the subset of tradelines.

9. The method of claim 1, further comprising associating the household size of wallet with the consumer.

10. The method of claim 1, further comprising targeting the consumer with a new product offer based on the household size of wallet.

11. The method of claim 1, further comprising targeting the consumer with a spend incentive for an existing product based on the household size of wallet.

12. The method of claim 1, wherein the removing results in unique tradelines being associated with the household.

13. The method of claim 1, wherein the removing results in different tradelines being associated with the household.

14. A system, comprising:
   a non-transitory memory communicating with a processor;

the non-transitory memory having instructions stored thereon that, in response to execution by the processor, cause the processor to perform operations comprising:

extracting, by the computer-based system and using a first application programming interface (API) having continuous access, current spending data for a consumer from a transaction processing system internet website that processed the spending data for the consumer;

extracting, by the computer-based system and using a second API having continuous access, current consumer panel data from consumer research companies' internet websites;

extracting, by the computer-based system and using a third API having continuous access, current consumer tradeline data from consumer credit companies' internet websites, wherein the extracting steps provide continuous access to the current spending data, the current consumer panel data, and the current consumer tradeline data;

modeling, by the computer-based system, consumer behavior and attributes including the consumer panel data and the consumer tradeline data, by using time series tradeline data and raw tradeline data;

enhancing, by the computer-based system, validation and refinement of an accuracy of the modeling via the continuous access to the current spending data, the current consumer panel data and the current consumer tradeline data;

verifying, by the computer-based system and periodically on an ongoing basis, an applicability of the modeling to the consumer;

determining, by the computer-based system and based on the modeling, a plurality of tradelines using point in time balance information;

associating, by the computer-based system, the plurality of tradelines with a household of the consumer;

removing, by the computer-based system, tradelines associated with a supplemental consumer in the plurality of tradelines from consideration in calculating a household size of wallet of the consumer, to create a subset of tradelines; and calculating, by the computer-based system, the household size of wallet based on the subset of tradelines.

15. The system of claim 14, wherein the removing is also based on comparing histories of tradelines.

16. The system of claim 14, wherein the removing is also based on comparing histories of tradelines within a time period.

17. The system of claim 14, wherein the removing comprises determining tradelines associated with the supplemental consumer based on comparing histories of tradelines.

18. The system of claim 14, wherein the tradelines associated with the supplemental consumer comprise duplicate tradelines.

19. The system of claim 14, wherein the removing is also based on comparing histories of tradelines, and wherein the histories of tradelines include at least one of account balance or transaction information.

20. A non-transitory computer readable storage medium bearing instructions, when executed by a processor, cause the processor to perform operations comprising:

extracting, by the computer-based system and using a first application programming interface (API) having continuous access, current spending data for a consumer from a transaction processing system internet website that processed the spending data for the consumer;

extracting, by the computer-based system and using a second API having continuous access, current consumer panel data from consumer research companies' internet websites;

extracting, by the computer-based system and using a third API having continuous access, current consumer tradeline data from consumer credit companies' internet websites, wherein the extracting steps provide continuous access to the current spending data, the current consumer panel data, and the current consumer tradeline data;

modeling, by the computer-based system, consumer behavior and attributes including the consumer panel data and the consumer tradeline data, by using time series tradeline data and raw tradeline data;

enhancing, by the computer-based system, validation and refinement of an accuracy of the modeling via the continuous access to the current spending data, the current consumer panel data and the current consumer tradeline data;

verifying, by the computer-based system and periodically on an ongoing basis, an applicability of the modeling to the consumer;

determining, by the computer-based system and based on the modeling, a plurality of tradelines using point in time balance information;

associating, by the computer-based system, the plurality of tradelines with a household of the consumer;

removing, by the computer-based system, tradelines associated with a supplemental consumer in the plurality of tradelines from consideration in calculating a household size of wallet of the consumer, to create a subset of tradelines; and calculating, by the computer-based system, the household size of wallet based on the subset of tradelines.

* * * * *